(12) United States Patent
Uehara et al.

(10) Patent No.: US 9,045,601 B2
(45) Date of Patent: Jun. 2, 2015

(54) METHOD FOR PRODUCING STEREO COMPLEX CRYSTALS OF POLYLACTIC ACID, POLYLACTIC ACID, AND MOLDED BODY, SYNTHETIC FIBER, POROUS BODY AND ION CONDUCTOR COMPRISING SAME

(75) Inventors: Hiroki Uehara, Kiryu (JP); Takeshi Yamanobe, Kiryu (JP); Yusuke Karaki, Kiryu (JP)

(73) Assignee: National University Corporation Gunma University, Gunma (JP)

( * ) Notice: Subject to any disclaimer, the term of this patent is extended or adjusted under 35 U.S.C. 154(b) by 578 days.

(21) Appl. No.: 13/393,465

(22) PCT Filed: Sep. 7, 2010

(86) PCT No.: PCT/JP2010/065348
§ 371 (c)(1),
(2), (4) Date: May 7, 2012

(87) PCT Pub. No.: WO2011/030766
PCT Pub. Date: Mar. 17, 2011

(65) Prior Publication Data
US 2012/0238652 A1    Sep. 20, 2012

(30) Foreign Application Priority Data

Sep. 10, 2009  (JP) .................................. 2009-209413

(51) Int. Cl.
| | |
|---|---|
| *C08J 9/26* | (2006.01) |
| *C08L 53/00* | (2006.01) |
| *C08J 3/00* | (2006.01) |
| *C08L 67/04* | (2006.01) |
| *D01F 6/84* | (2006.01) |
| *D01F 6/92* | (2006.01) |

(52) U.S. Cl.
CPC .............. *C08J 3/005* (2013.01); *C08J 2367/04* (2013.01); *C08L 67/04* (2013.01); *D01F 6/84* (2013.01); *D01F 6/92* (2013.01)

(58) Field of Classification Search
CPC .......... C08J 3/005; C08J 2367/04; C08J 9/26; C08J 67/04; C08L 67/04
USPC ............ 521/61, 172, 182, 189; 525/450, 540, 525/418
See application file for complete search history.

(56) References Cited

U.S. PATENT DOCUMENTS

2008/0097074 A1* 4/2008 Ouchi et al. .................. 528/354

FOREIGN PATENT DOCUMENTS

| | | |
|---|---|---|
| EP | 2098551 A1 | 9/2009 |
| JP | H1-225622 | 9/1989 |
| JP | 63241024 | 10/1998 |
| JP | 2003-64174 | 3/2003 |
| JP | 2005042084 | 2/2005 |
| JP | 2007191625 A | 8/2007 |
| JP | 2008-248116 A | 10/2008 |
| JP | 2008248029 A | 10/2008 |
| JP | 2009001614 | 1/2009 |

OTHER PUBLICATIONS

He et al., "Unique crystallization behavior of poly(L-lactide)/poly(D-lactide) stereocomplex depending on initial melt states," Polymer 49, 2008, pp. 5670-5675.

Tsuji et al., "Stereocomplex Formation between Enantiomeric Poly(lactic acids)s. 3. Calorimetric Studies on Blend Films Cast from Dilute Solution," Macromolecules 1991, pp. 5651-5656.

Kanwal, et al., "Ultrasonic Degradation of Polystyrene Solutions", Polymer Degradation and Stability, 68(3):445-449, May 11, 2000 (5 pages).

Uehara, et al., "Size-Selective Diffusion in Nanoporous but Flexible Membranes for Glucose Sensors", ACS Nano, American Chemical Society, 3(4):924-932, published online Mar. 26, 2009 (9 pages).

Uehara, et al., "Communications to the Editor: Nanoporous Polyethylene Film Prepared from Bicontinuous Crystalline/Amorphous Structure of Block Copolymer Precursor", Macromolecules, 39(12):3971-3974, Jun. 13, 2006 (4 Pages).

Yui, et al., "Stereo Block Copolymers of L- and D-lactides", Die Makromolekulare Chemie, 191(3):481-488, Mar. 1990 (8 pages).

* cited by examiner

*Primary Examiner* — Irina S Zemel
(74) *Attorney, Agent, or Firm* — Wilmer Cutler Pickering Hale and Dorr LLP

(57) ABSTRACT

The present invention provides a method for producing stereo complex crystals of polylactic acid, with which a polylactic acid having excellent heat resistance and containing stereo complex crystals at a high ratio can be efficiently produced, the method including: a step of dissolving in a solvent a block copolymer, which includes polylactic acid containing an L-lactic acid unit or poly lactic acid containing a D-lactic acid unit together with at least one kind of an organic polymer having a different structure from that of polylactic acid, and a polylactic acid homopolymer containing a D-lactic acid unit or a polylactic acid homopolymer containing an L-lactic acid unit, the lactic acid unit being an optical isomer that is not contained in the block copolymer, to prepare a polymer mixture solution; and a step of removing the solvent from the polymer mixture solution.

18 Claims, 14 Drawing Sheets

METHOD FOR PRODUCING STEREO COMPLEX CRYSTALS OF POLYLACTIC ACID, POLYLACTIC ACID, AND MOLDED BODY, SYNTHETIC FIBER, POROUS BODY AND ION CONDUCTOR COMPRISING SAME

TECHNICAL FIELD

The present invention relates to a method for producing stereo complex crystals of polylactic acid, a polylactic acid obtained by the production method, and a molded body, a synthetic fiber, a porous body, and an ion conductor respectively containing the polylactic acid, and more specifically, the present invention relates to a method for producing stereo complex crystals of polylactic acid, with which a polylactic acid having a higher content of stereo complex crystals than those of conventional polylactic acids can be efficiently produced; a polylactic acid which is obtained by the production method, has a high melting temperature and is useful for forming a molded body, a synthetic fiber, a porous body, or an ion conductor; and a molded body, a synthetic fiber, a porous body, and an ion conductor respectively containing the polylactic acid.

BACKGROUND ART

Recently, biomass resins obtainable from plant-based components as raw materials have been attracting much attention, as compared with conventional synthetic resins synthesized from petroleum, and various studies have been made of biomass resins. Such plant-derived resins are carbon neutral materials, since, even if they are burned during disposal, plants absorb the generated carbon dioxide to undergo photosynthesis and become raw materials, and replacement of conventional synthetic resins with these plant-derived resins is expected to be a method that contributes to the prevention of global warming. As these resins derived from living organisms, polyhydroxybutyrate, polylactic acid, and the like are known, and among these, polylactic acid has attracted much attention since polylactic acid is advantageous in that lactic acid, lactides, or the like, which are obtainable from plant resources such as corn, can be used as a raw material, and that polylactic acid has thermal plasticity and can be fabricated by melting. However, the melting point of general polylactic acid is about 170° C., and therefore, improvement in heat resistance has been required for their application to resin molded bodies or a synthetic fibers.

Poly-L-lactic acid (hereinbelow, as appropriate, referred to as "PLLA"), which is composed of only an L-lactic acid unit, which is an optical isomer, and poly-D-lactic acid (hereinbelow, as appropriate, referred to as "PDLA"), which is composed of only a D-lactic acid unit, exist as polylactic acids, and it is known and noted that, when these make a pair and are filled in a crystal lattice to generate a stereo complex crystal, an increase in the melting point is realized.

For example, it is known that when PLLA and PDLA are mixed together in the state of a solution or in a molten state, stereo complex crystals are formed (see Japanese Patent Application Laid-Open (JP-A) No. 63-241024, *Macromolecules*, Vol. 24, pages 5651-5656 (1991) and *Polymer*, Vol. 49, pages 5670-5675 (2008)). These stereo complex crystals have a melting point higher than that of α crystal (melting point 170° C.) obtainable from a homopolymer of PLLA or PDLA, and exhibit resistance to hydrolysis; however, when the molecular weight of PLLA or PDLA, which is used as a raw material, is high, it is hard to efficiently obtain stereo complex crystals. In addition, there are problems in that the yield of stereo complex crystals differs according to the conditions for preparation such as the molecular weight of the raw material or the mixing temperature, and that it takes a lot of time to grow, and the like, and thus, in practice, stable production of stereo complex crystals has not yet been realized.

Further, an attempt has been made to generate stereo complex crystals having a melting point higher than those of α crystals, by mixing a homopolymer of PLLA and a homopolymer of PDLA at a ratio of 1:1 (see, for example, *Macromolecules*, Vol. 24, pages 5651-5656 (1991) and *Polymer*, Vol. 49, pages 5670-5675 (2008)); however, the melting point of the stereo complex crystal to be obtained is 230° C. at highest, and there is still room for improvement in heat resistance in order to enable application to molded bodies or synthetic fibers.

Moreover, a method of melt-mixing or solution-mixing copolymers containing an L-lactic acid block and a D-lactic acid block, the copolymers having different composition ratios from each other, to prepare a polylactic acid having a high content of stereo complex crystals has been proposed (see, for example, JP-A No. 2007-191625). However, in this production method, the processes are complicated in that, first, plural copolymers containing a L-lactic acid block and a D-lactic acid block are prepared, and the melting point of the obtained polylactic acid is from 147° C. to 211° C., and therefore, the obtained polylactic acid is less likely to be applied to a material for a molded body or the like that needs to have heat resistance.

For this reason, a technique for stably and efficiently producing a polylactic acid that contains stereo complex crystals at a high ratio and has excellent heat resistance is required.

DISCLOSURE OF INVENTION

Technical Problem

The object of the present invention is to provide a method for producing stereo complex crystals of polylactic acid, with which a polylactic acid having excellent heat resistance and containing stereo complex crystals at a high ratio can be produced.

Another object of the present invention is to provide a polylactic acid which is obtained by the production method of the present invention, contains stereo complex crystals at a high ratio, and has excellent heat resistance; and a molded body and a synthetic fiber, which are obtained by using the polylactic acid or by containing the polylactic acid, and have excellent heat resistance, biocompatibility, transparency, and chemical stability.

Moreover, yet another object of the present invention is to provide a porous body by decomposing and removing the component other than polylactic acid from the molded body or the synthetic fiber. Further, yet another object of the present invention is to provide an ion conductor by applying an ion source to the component other than polylactic acid.

Solution to Problem

The present inventors conducted investigations with a view to achieving the above objects and, as a result, it has been found that the above objects can be attained by a method for producing a polylactic acid containing stereo complex crystals at a high content ratio, using a block copolymer in which PLLA or PDLA and a polymer compound other than polylactic acid are covalently bonded together, whereby the present invention has been completed.

Namely, the configuration of the present invention is as follows.

The invention according to claim 1 is
a method for producing stereo complex crystals of polylactic acid, the method including: a step of dissolving in a solvent, to prepare a polymer mixture solution: a block copolymer including at least one kind of an organic polymer having a different structure from polylactic acid and polylactic acid containing an L-lactic acid unit or polylactic acid containing a D-lactic acid unit; and a polylactic acid homopolymer containing a D-lactic acid unit that is an optical isomer that is not contained in the block copolymer or a polylactic acid homopolymer containing an L-lactic acid unit that is an optical isomer that is not contained in the block copolymer; and a step of removing the solvent from the polymer mixture solution to obtain a polymer mixture.

In this production method, after the step of removing the solvent from the polymer mixture solution, a heat treatment step may further be carried out, as the invention described in claim 2.

In this process, regarding the chemical structure of the block copolymer to be used, it is enough that the block copolymer is a copolymer composed of plural block components including polylactic acid, for example, diblock (two kinds of components including polylactic acid), triblock (three kinds of components including polylactic acid), tetrablock (four kinds of components including polylactic acid), pentablock (five kinds of components including polylactic acid), or the like. Further, the copolymer may be a star-like block copolymer in which plural blocks including polylactic acid radiate in all directions.

The invention according to claim 3 is
the method for producing stereo complex crystals of polylactic acid described in claim 1 or claim 2, wherein, in the polymer mixture solution, a content ratio of the polylactic acid containing an L-lactic acid unit or the polylactic acid containing a D-lactic acid unit, which is contained in the block copolymer, relative to the content of the polylactic acid homopolymer containing a D-lactic acid unit or the polylactic acid homopolymer containing an L-lactic acid unit is in a range of from 10:90 to 90:10.

The invention according to claim 4 is
the method for producing stereo complex crystals of polylactic acid described in any one of claim 1 to claim 3, wherein, in the polymer mixture solution, the molecular weight of the polylactic acid containing an L-lactic acid unit or the polylactic acid containing a D-lactic acid unit, which is contained in the block copolymer, is from 10,000 to 1,000,000.

The invention according to claim 5 is
the method for producing stereo complex crystals of polylactic acid described in any one of claim 1 to claim 4, wherein, in the polymer mixture solution, the molecular weight of the polylactic acid homopolymer containing a D-lactic acid unit or the polylactic acid homopolymer containing an L-lactic acid unit is from 10,000 to 1,000,000.

The invention according to claim 6 is
the method for producing stereo complex crystals of polylactic acid described in any one of claim 1 to claim 5, wherein the step of heat treating the obtained polymer mixture is a step of heat treating at a heat treatment temperature in a range of from 100° C. to 300° C. for a heat treatment time in a range of from 1 minute to 72 hours.

The invention according to claim 7 is
the method for producing stereo complex crystals of polylactic acid described in any one of claim 1 to claim 6, wherein the organic polymer having a different structure from that of polylactic acid is one or more kinds selected from the group consisting of polystyrene, polyvinyl naphthalene, polymethyl methacrylate, poly-ϵ-caprolactone (polycaprolactam), polybutadiene, polydimethylsiloxane, polyethylene, polypropylene, poly-1-butene, poly-4-methyl-1-pentene, polynorbornenyl ethylstyrene, polynorbornenyl ethylstyrene-s-styrene, polyhexamethyl carbonate, polyhexylnorbornene, polybutyl succinate, polydicyclopentadiene, polycyclohexyl ethylene, poly-1,5-dioxepan-2-one, polymenthide, poly-4-vinylpyridine, polyisoprene, poly-3-hydroxybutyrate, poly-2-hydroxymethacrylate, poly-N-vinyl-2-pyrrolidone, poly-4-acryloylmorpholine, and derivatives thereof.

The invention according to claim 8 is
the method for producing stereo complex crystals of polylactic acid described in any one of claim 1 to claim 6, wherein the organic polymer having a different structure from that of polylactic acid is one or more kinds selected from the group consisting of polystyrenesulfonic acid, polyethylene glycol, polyethylene oxide, poly-n-propyl-p-styrenesulfonic acid, polyacrylamide, polydimethylacrylamide, poly-N-isopropylacrylamide, poly-N,N-dimethylamino-2-ethyl methacrylate, poly-N-2-hydroxypropyl-methacrylamide, and derivatives thereof.

The invention according to claim 9 is
the method for producing stereo complex crystals of polylactic acid described in any one of claim 1 to claim 8, wherein, in the block copolymer including at least one kind of an organic polymer having a different structure from that of polylactic acid and polylactic acid containing an L-lactic acid unit or polylactic acid containing a D-lactic acid unit, the content ratio of the polylactic acid containing an L-lactic acid unit or the polylactic acid containing a D-lactic acid unit relative to the organic polymer having a different structure from that of polylactic acid is in a range of from 10:90 to 90:10.

The invention according to claim 10 is
a polylactic acid obtained by the method for producing stereo complex crystals of polylactic acid according to any one of claim 1 to claim 9, having a content ratio of stereo complex crystals relative to the polylactic acid component of 10% by mass or higher, and a content ratio of the organic polymer having a different structure from that of polylactic acid of from 1% by mass to 99% by mass, and having a melting point of from 220° C. to 260° C.

The invention according to claim 11 is
a molded body configured to include the polylactic acid described in claim 10.

The invention according to claim 12 is
a synthetic fiber configured to include the polylactic acid described in claim 10.

The invention according to claim 13 is
a porous body formed by decomposing and removing a component other than polylactic acid from at least any of the polylactic acid described in claim 10, the molded body described in claim 11, or the synthetic fiber described in claim 12.

The invention according to claim 14 is
an ion conductor formed by applying an ion source to a component other than polylactic acid, which is contained in at least any of the polylactic acid described in claim 10, the molded body described in claim 11, or the synthetic fiber described in claim 12.

The function of the present invention is not clear, but is guessed as follows.

In the production method of the present invention, first, a block copolymer containing PLLA or PDLA and a polymer compound other than polylactic acid is synthesized. To this, a PDLA homopolymer or a PLLA homopolymer, the homopolymer being an optical isomer that is not contained in the block copolymer, is added, and the two components are dissolved in a solvent and mixed. For example, when a diblock copolymer (PS-b-PLLA) containing polystyrene (PS) and PLLA as block copolymer components is used for explanation, it is thought that, after dissolving in a solvent the block copolymer and a PDLA homopolymer, as the solvent is removed, the polystyrene component in the block copolymer and a component, which is obtained by fusing the PLLA component in the block copolymer and the PDLA homopolymer, form a phase separated structure in nano-meter order, and in the phase separated structure, the PLLA portion derived from the block copolymer and the PDLA in the PDLA homopolymer added are present close to each other, and thus, stereo complex crystals are formed efficiently. Therefore, as compared with the conventional method in which a PLLA homopolymer and a PDLA homopolymer are mixed in a solvent and then the solvent is removed, due to the formation of stereo complex crystals in a close state in the phase separated structure, the remaining of a phase derived from the homopolymer is suppressed, resulting in achieving a higher content ratio of stereo complex crystals. Further, since the polylactic acid component including the stereo complex crystals is kept in a nano-sized phase separated structure formed with polystyrene, the polylactic acid component is in a restricted state, and therefore, it is thought that the polylactic acid component has more excellent heat resistance than that of the stereo complex crystals prepared from a PLLA homopolymer and a PDLA homopolymer.

It should be noted that the term "polylactic acid" described in claim 10 of the present specification refers to the polylactic acid obtained by the production method of the present invention, and is a polylactic acid-containing polymer mixture that contains an additional polymer due to the production method, together with the stereo complex crystals. In the present specification, hereinbelow, the term "polylactic acid of the present invention" refers to such a "polylactic acid-containing polymer mixture".

Advantageous Effects of Invention

According to the present invention, a method for producing stereo complex crystals of polylactic acid, with which a polylactic acid having excellent heat resistance and containing stereo complex crystals (hereinbelow, appropriately, referred to as "SC crystals") at a high ratio can be efficiently produced, may be provided.

Further, according to the present invention, a polylactic acid which has excellent heat resistance, contains stereo complex crystals at a high ratio, and is useful for the production of a molded body, a synthetic fiber, a porous body, an ion conductor, and the like, and a molded body, a synthetic fiber, a porous body, and an ion conductor which are obtained by using the polylactic acid of the present invention or by containing the polylactic acid, and have excellent heat resistance may be provided.

DESCRIPTION OF EMBODIMENTS

Figure 1:
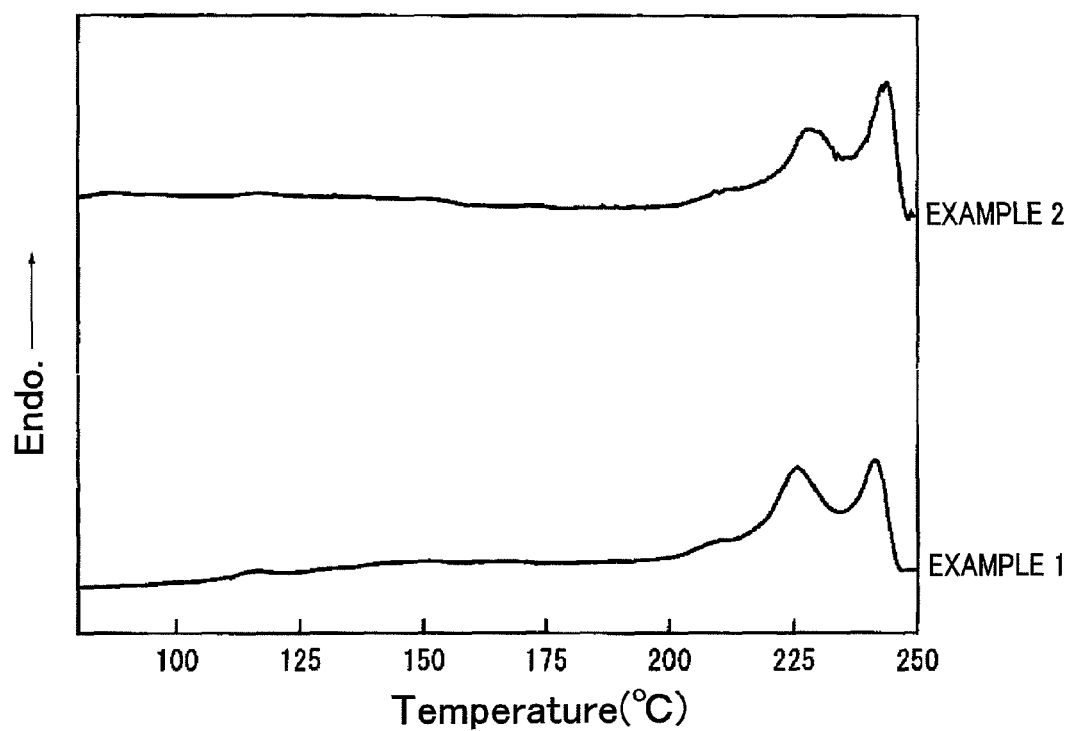
FIG. 1 is a graph showing the results of DSC measurement used for the measurement of melting points of the polylactic acids obtained in Example 1 and Example 2.

Hereinbelow, the present invention is explained in detail.

The method for producing stereo complex crystals of polylactic acid according to claim 1 of the present invention is characterized in that the method includes: a step of dissolving in a solvent a block copolymer including polylactic acid containing an L-lactic acid unit or polylactic acid containing a D-lactic acid unit together with at least one kind of an organic polymer having a different structure from that of polylactic acid, and a polylactic acid homopolymer containing a D-lactic acid unit or a polylactic acid homopolymer containing an L-lactic acid unit, the lactic acid unit being an optical isomer that is not contained in the block copolymer, to prepare a polymer mixture solution (hereinbelow, referred to as a mixture solution preparing step); and a step of removing the solvent from the polymer mixture solution (hereinbelow, referred to as a solvent removing step).

The method may have a step of heat treating the obtained molded body (hereinbelow, referred to as a heat treatment step), as necessary, after the solvent removing step.

The above mixture solution preparing step includes two embodiments, namely, a step of dissolving in a solvent a block copolymer including polylactic acid containing an L-lactic acid unit and at least one kind of an organic polymer having a different structure from that of polylactic acid, and a polylactic acid homopolymer containing a D-lactic acid unit, to prepare a polymer mixture solution (mixture solution preparing step (1)), and a step of dissolving in a solvent a block copolymer including polylactic acid containing a D-lactic acid unit and at least one kind of an organic polymer having a different structure from that of polylactic acid, and a polylactic acid homopolymer containing a L-lactic acid unit, to prepare a polymer mixture solution (mixture solution preparing step (2)), and in either case, the same effect is realized.

In the second embodiment of the present invention, a step substantially similar to the step in the first embodiment is included except that a block copolymer containing PDLA is used as the block copolymer and, to this, a PLLA homopolymer is added.

Further, the solvent removing step may be carried out by any means capable of removing the solvent from the polymer mixture liquid, and may be, for example, any of a step of removing the solvent by vaporization (including a solvent removing step by spin coating or by the electrostatic spinning method), a step of removing the solvent by filtration, a step of removing the solvent by absorbing the solvent using filter paper or the like, or a step of adding the mixture solution to a poor solvent that does not dissolve polylactic acid to separate the polylactic acid; and further, these steps may be carried out alone or may be carried out by appropriately combining them, and in a case in which the solvent removing step includes two or more of the steps described above, it is possible to repeat the respective steps to be carried out, and the order and frequency may be arbitrarily selected.

After the solvent removing step, in a case in which the polymer mixture obtained by removing the solvent forms a molded body in the form of a membrane, a film, a sheet, powder, or the like, a further heating step or molded body forming step may not be conducted. As described above, the membranous or powdery solid component which is obtained after the solvent removing step is also included in the molded body of the present invention. After the solvent removing step, also in the case in which a membranous or powdery molded body is formed, a heating step may be carried out as required.

Further, a molded body having a different form from that of the raw material molded body, such as structure or fiber, may be formed by using the obtained molded body in the form of a membrane, powder, or the like as a raw material and adding a further molding step. In this process, as the molding step, a known method such as press molding, roll molding, stretch molding (uniaxial or biaxial), kneading or extrusion molding, injection molding, melt spinning, or electrostatic spinning may be utilized.

As described above, by using the polymer mixture body according to the present invention, a molded body, a synthetic fiber, a porous body, and an ion conductor, each containing the polylactic acid having excellent heat resistance, and the like are obtained.

In this process, the above mixture solution preparing step, solvent removing step, heat treatment step, molding step, perforating step, ion source applying step, or the like may be repeated, and the order and frequency may be arbitrarily selected. For example, in a case in which the stereo complex crystallized polylactic acid obtained through the above mixture solution preparing step and solvent removing step is again dissolved or swelled in the solvent and is subjected to a mixture solution preparing step, there is a case in which, even though the dissolution conditions are the same as the conditions of the first mixture solution preparing step, the once-formed stereo complex crystal does not dissolve thoroughly and remains, and this acts as a nucleus in the solvent removing step, the heat treatment step, or the molding step, resulting in the formation of stereo complex crystals at a higher ratio.

Hereinbelow, as an example, the case of using a block copolymer including a PLLA polymer and an additional polymer compound (an organic polymer having a different structure from that of polylactic acid) and a PDLA homopolymer, the case being the first embodiment of the present invention, is explained.

<Mixture Solution Preparing Step (1)>

In this step, first, a copolymer including PLLA and a polymer compound other than polylactic acid is prepared.

The PLLA polymer which is used for forming the block copolymer is a polymer containing an L-lactic acid unit as a main component, should contain the L-lactic acid unit in a proportion of 5% by weight or higher, and is preferably a polymer consists of 100% L-lactic acid unit excluding unavoidable impurities.

The weight average molecular weight of the PLLA polymer is preferably from 10,000 to 1,000,000, and more preferably from 10,000 to 500,000. Further, the molecular weight distribution is preferably from 1 to 10, more preferably from 1 to 2, and even more preferably from 1 to 1.5.

Here, with regard to the molecular weight of the PLLA homopolymer, when a compound having a high molecular weight, for example, a compound having a molecular weight of 10,000 or more, and more preferably 50,000 or more, is used, physical properties of the obtained polylactic acid of the present invention or the molded body formed from the polylactic acid, especially membrane-forming property or the strength of the formed membrane, may be improved.

The terminal of the PLLA polymer may be capped by a terminal capping group. Examples of such a terminal capping group include an acetylene group, an ester group, an ether group, an amido group, and a urethane group.

The PLLA polymer may be produced by a known polymerization method of polylactic acid, as exemplified by a method of performing ring-opening polymerization of lactide, dehydration condensation of lactic acid, or a combination of any one of them and solid-phase polymerization, and then allowing melt solidification. More specifically, the PLLA polymer may be synthesized by a living step polymerization method of lactide, which is a cyclic dimer of lactic acid, as described in Makromol. Chem. Vol. 191, pages 481-488 (1990) and JP-A No. 1-225622; a direct ring-opening polymerization method of a racemic body of lactide using a specific stereoselective polymerization catalyst, as described in JP-A No. 2003-64174; a melt polymerization method from lactic acid; or a ring-opening method of lactide.

Further, the PLLA polymer may contain a catalyst for polymerization, as long as the thermal stability is not damaged. Examples of the catalyst may include aluminum compounds, lithium compounds, tin compounds, titanium compounds, calcium compounds, organic acids, and inorganic acids, and further, a stabilizer for deactivating the catalyst may be coexistent.

PLLA homopolymers are also commercially available and, for example, trade name: P8939-LA, manufactured by Polymer Source, Inc. (molecular weight 17,000), trade name: LACEA, manufactured by Mitsui Chemicals, Inc. (molecular weight 230,000), and the like are cited.

There is no particular limitation as to the organic polymer (hereinbelow, appropriately, referred to as the additional polymer compound) which forms the block copolymer and has a different structure from that of polylactic acid, but in the present invention, since it is assumed that the block copolymer forms a micro-phase separated structure, and in the mocro-phase separated structure, PLLA and PDLA are present close to each other and are kept in the structure at the same time, and thus a polylactic acid exhibiting a high melting point is obtained, it is important that the polylactic acid (PLLA or PDLA) component and the additional polymer compound form a micro-phase separated structure in the block copolymer. Here, in the case of a diblock copolymer including A polymer and B polymer, assuming that the size of A monomer and the size of B monomer are equal, it is known that micro-phase separation occurs when the interaction parameter (χ) of A polymer and B polymer satisfies the following equation.

$$\chi n > 10.5$$

In the above equation, n represents the polymerization degree of the block copolymer. Accordingly, it is required that the additional polymer compound in the present invention accepts this condition with respect to the polylactic acid. This concept is described in detail in KISO KAGAKU KOSU (Fundamental Chemistry Course), KOBUNSHI KAGAKU II—BUSSEI— (Polymer Chemistry II—Physical Properties—), (Maruzen Co., Ltd, written by Hirohide Matsushita, published in 1996) page 68, which is herein incorporated by reference.

Further, from the viewpoint of carrying out solution mixing with the polylactic acid homopolymer, the additional polymer compound is preferably a polymer that can be dissolved in a common solvent with polylactic acid. Moreover, from the viewpoint of carrying out a heat treatment step with respect to the polylactic acid, it is preferable that the thermal decomposition temperature is 200° C. or higher.

Specific examples of the additional polymer compound, which can be used in the present invention, include polystyrene, polybutylstyrene, polymethylstyrene, polyvinyltoluene, polychlorovinyl-styrene, poly-4-butylstyrene, polystyrenesulfonic acid, and other polystyrenes; polyvinyl naphthalene, polyethylene, polypropylene, poly-1-butene, poly-4-methyl-1-pentene, and other polyolefines; polybutadiene, polyisoprene, polyisobutylene, polyoxymethylene, polydimethylsiloxane, polytetramethyl-p-silphenylene siloxane, polyarylene-siloxane, polyacrylonitrile, polycarbonate, polyethylene terephthalate, polybutylene terephthalate, polyethylene naphthalate, polybutylene naphthalate, and other aromatic polyesters; poly-ε-caprolactone, nylon 6 (polycaprolactam), nylon 66, nylon 46, nylon 6-10, and other nylons; polyethyl methacrylate, polymethyl methacrylate, polyisopropyl methacrylate, polybutyl methacrylate, polyisobutyl methacrylate, polyhexyl methacrylate, polycyclohexyl methacrylate, polylauryl methacrylate, poly-2-hydroxyethyl methacrylate, and other methacrylate resins; polyethyl acrylate, polymethyl acrylate, polyisopropyl acrylate, polybutyl acrylate, polyisobutyl acrylate, polyhexyl acrylate, polydecyl acrylate, polylauryl acrylate, and other acrylate resins; poly-p-xylene, polyvinyl pyrrolidone, polyvinyl chloride, polyvinylidene chloride, polyvinyl fluoride, polyvinylidene fluoride, polyimides, polyphenylene sulfide, polysulfone, polyphenylene ether sulfide, polyacetylene, polyether ketone, polyether ether ketone, polycarbonate, polyethylene glycol, polyethylene oxide, polypropylene glycol, polypropylene oxide, polynorbornenyl ethylstyrene, polynorbornenyl ethylstyrene-s-styrene, polynorbornene, polyhexamethyl carbonate, polyhexylnorbornene, poly-n-propyl-p-styrenesulfonic acid, polybutyl succinate, polydicylcopentadiene, polydimethylacrylamide, polycyclohexyl ethylene, poly-1,5-dioxepan-2-one, polymenthide, polyacrylamide, poly-4-vinylpyridine, polydimethyl acrylamide, poly-N-isopropylacrylamide, polyisoprene, poly-3-alkylthiopene, polydioxanone, poly-2-(N,N-dimethylamino)ethyl methacrylate, poly-3-hydroxybutyrate, polybutylene succinate, poly-2-hydroxyethyl methacrylate, poly-N-2-hydroxypropyl-methacrylamide, poly-N-vinyl-2-pyrrolidone, poly-4-acryloylmorpholine, and derivatives thereof.

Among them, from the viewpoints of ease of synthesis of the block copolymer with the coexisting PLLA polymer or PDLA polymer, having a great interaction parameter (χ) to polylactic acid, and ease of forming a phase separated structure, polystyrene, polyvinyl naphthalene, polymethyl methacrylate, poly-ε-caprolactone, polycaprolactam, polybutadiene, polydimethylsiloxane, polyethylene, polypropylene, poly-1-butene, poly-4-methyl-1-pentene, polynorbornenyl ethylstyrene, polynorbornenyl ethylstyrene-s-styrene, polyhexamethyl carbonate, polyhexylnorbornene, polybutyl succinate, polydicyclopentadiene, polycyclohexyl ethylene, poly-1,5-dioxepan-2-one, polymenthide, poly-4-vinylpyridine, polyisoprene, poly-3-hydroxybutyrate, poly-2-hydroxyethyl methacrylate, poly-N-vinyl-2-pyrrolidone, poly-4-acryloylmorpholine, and derivatives thereof, each of which is an organic polymer having relatively high hydrophobicity; or polystyrenesulfonic acid, polyethylene glycol, polyethylene oxide, poly-n-propyl-p-styrenesulfonic acid, polyacrylamide, polydimethylacrylamide, poly-N-isopropylacrylamide, poly-2-(N,N-dimethylamino)ethyl methacrylate, poly-N-2-hydroxypropyl-methacrylamide, and derivatives thereof, each of which is an organic polymer having a relatively high hydrophilicity, are preferable.

The above additional polymer compound is suitably used in the production method of the present invention, as the polymer compound satisfies the above physical properties, but since the additional polymer compound remains in the polylactic acid obtained by the production method of the present invention and in the molded body formed from the polylactic acid, depending on the application purpose of the polylactic acid or the molded body, a polymer compound which is suitable to the application purpose may be selected as appropriate from these additional polymer compounds.

For example, in a case in which the polylactic acid obtained by the production method of the present invention has biocompatibility and is used in drug delivery, artificial skins, artificial blood vessels, sutures in operation, blood purifying filters/artificial kidneys (in the case of a porous body), or the like, a polymer compound having biocompatibility is selected, and from such a point of view, more specifically, polyethylene glycol, polyethylene oxide, polypropylene glycol, polypropylene oxide, poly-ε-caprolactone (caprolactam), polybutyl succinate, polydimethylacrylamide, poly-N,N-dimethylamino-2-ethyl methacrylate, poly-3-hydroxybutyrate, poly-2-hydroxymethacrylate, poly-N-2-hydroxypropyl-methacrylamide, and the like are cited.

Further, as a substance which has thermal plasticity and is suitable for fabricating a molded body (a film, a fiber, or the like), polystyrene, polymethyl methacrylate, polyethylene, polypropylene, poly-1-butene, poly-4-methyl-1-pentene, and other polyolefines; polybutadiene, polyisoprene, polyisobutylene, polyoxymethylene, polyacrylonitrile, polycarbonate, polyethylene terephthalate, polybutylene terephthalate, polyethylene naphthalate, polybutylene naphthalate, and other aromatic polyesters; poly-ε-caprolactone, nylon 6 (polycaprolactam), nylon 66, nylon 46, nylon 6-10, and other nylons; polyethyl methacrylate, polymethyl methacrylate, polyisopropyl acrylate, polybutyl methacrylate, polyisobutyl acrylate, polyhexyl acrylate, polycyclohexyl methacrylate, polylauryl methacrylate, poly-2-hydroxymethacrylate, and other methacrylate resins; polyvinyl chloride, polyvinylidene chloride, polyvinyl fluoride, polyvinylidene fluoride, poly-3-hydroxybutyrate, polyhydroxysuccinate, polycyclohexyl ethylene, polycarbonate, and the like are cited.

Moreover, as a substance which has a low dielectric constant and is suitably used in electronic circuit base materials or the like, polydimethylsiloxane and the like are cited.

In addition, as a substance that is suitable for fabricating a rubbery elastic body, polybutadiene, polyisoprene, polyisobutylene, and the like are cited.

From the viewpoint of having a high adhesive property to other materials, polyethyl acrylate, polymethyl acrylate, polyisopropyl acrylate, polybutyl acrylate, polyisobutyl acrylate, polyhexyl acrylate, polydecyl acrylate, polylauryl acrylate, other acrylate resins, and the like are cited.

Especially, in the case of forming a molded body, a film, a sheet, or the like, as a substance which is likely to cause crosslinking and has excellent mechanical strength or excellent elongation, polybutadiene, polydimethylsiloxane, polynorbornenyl ethylstyrene, polynorbornenyl ethylstyrene-s-styrene, polynorbornene, polyhexamethyl carbonate, polyhexylnorbornene, polyisoprene, or the like can be selected.

Further, in the case of using the molded body of the present invention for an ion conductor, which is described below in detail, or the like, from the viewpoint of ease of molecular modification or having already an ion source, polystyrene, polystyrenesulfonic acid, polybutylstyrene, polymethylstyrene, polyvinyltoluene, polychlorovinyl-styrene, poly-4-butylstyrene, other polystyrenes, polyvinyl naphthalene, polysulfone, polyphenylene ether sulfide, poly-n-propyl-p-styrenesulfonic acid, polydicyclopentadiene, poly-3-alkylthiophene, or the like may be selected.

Further, poly-1,5-dioxepan-2-one, polymenthide, or the like can also be used.

Moreover, from the viewpoint of ease of obtaining a polymer compound having uniform physical properties, polystyrene, polymethyl methacrylate, polydimethylsiloxane, poly-4-vinylpyridine, polydimethylacrylamide, and the like are preferably described, each of which forms a block copolymer with PLLA or PDLA, the block copolymer being commercially available from Polymer Source, Inc. or the like.

It is enough that the polymer compound, which forms a block copolymer with polylactic acid and has a different structure from that of polylactic acid, contains at least one kind of the above polymer compounds, and may be a copolymer including a polymer compound other than the above polymer compound and the above polymer compound. Alternatively, the additional polymer compound may be a copolymer containing two or more of the above polymer compounds. In this case, the form of the copolymer may be either a block copolymer or a random copolymer.

The polymer component, which forms a block copolymer with polylactic acid and has a different structure from that of polylactic acid, may be modified by a chemical treatment or the like, prior to the production of stereo complex crystals or a molded body containing the same. For example, a block copolymer including polylactic acid and polystyrene is synthesized, then this block copolymer is sulfonated to produce a block copolymer including polylactic acid and polystyrenesulfonic acid, and then the resulting block copolymer may be used as a raw material for producing the above stereo complex crystals or the molded body containing the same. By this operation, there is attained an advantage that a chemical treatment for applying an ion source or biocompatibility, or for perforating may not be carried out after the solvent removing step or the heat treatment step, or may be carried out more efficiently.

In the block copolymer including PLLA or PDLA and the polymer compound other than polylactic acid, the chemical structure of the junction point between the PLLA or PDLA and the polymer compound other than polylactic acid, or the junction point between the polymer compounds which are other than polylactic acid and have a different structure from each other is not particularly limited, and examples include —O—, —COO—, —NH—, —CO—, —$CH_2$—, —$OCHCH_3CH_2$—, —$OCHCHCH_3CH_2CH_2$—, —$OCH_2CH_2$—O—$CH_2$—, —CO—$CH_2$—, —$CH_2CH_2NH$—, —$SiCH_3CH_3$—, —$SiCH_3CH_3$—, —$SiCH_3CH_3CH_2$—, —$CH_2CH_2O$—, —$COCCH_3$=CH—, —$CH_2CH_2S$—, —$CH_2CH$=CH—, and -ph-CH=CH—; and among them, —O—, —COO—, —NH—, —CO—, —$CH_2$—, —$CH_2CH_2O$—, —$COCCH_3$=CH—, and —$CH_2CH$=CH— are preferable.

In the block copolymer including PLLA or PDLA and the polymer compound other than polylactic acid, when the chemical structure of the junction point between the PLLA or PDLA and the polymer compound other than polylactic acid, or the junction point between the polymer compounds which are other than polylactic acid and have a different structure from each other has such a junction point structure, the block copolymer does not decompose at all, resulting in becoming possible to be incorporated in the polylactic acid of the present invention or in a molded body thereof.

The terminal structure of the additional organic polymer compound in the present invention is not particularly limited, and examples thereof include —OH, —COOH, —$NH_2$, —CHO, —$CH_3$, —$OCHCH_3CH_3$, —$OCHCHCH_3CH_2CH_3$, —$OCH_2CH_2$—O—$CH_3$, —CO—$CH_3$, —$CH_2CH_2NH_2$, —$CH_2Cl$, —COCl, —$SiCH_3CH_3Cl$, —$SiCH_3CH_3H$, —$SiCH_3CH_3CH_3$, —$CH_2CH_2OH$, —$COCCH_3$=$CH_2$, —$CH_2CH_2SH$, —$CH_2CH$=$CH_2$, -ph-CH=$CH_2$, and —$SO_3H$, and among them, —OH, —COOH, —$NH_2$, —CHO, —$CH_3$, —$CH_2CH_2OH$, —$COCCH_3$=$CH_2$, —$CH_2CH$=$CH_2$, and —$SO_3H$ are preferable.

When the additional polymer compound has such a terminal structure, it becomes possible to carry out various chemical modifications of the polylactic acid obtained by the production method of the present invention.

The weight average molecular weight of the additional polymer compound that forms the block copolymer is preferably from 10,000 to 1,000,000, and more preferably from 10,000 to 500,000. Further, the molecular weight distribution is preferably from 1 to 10, more preferably from 1 to 2, and even more preferably from 1 to 1.5.

In the block copolymer including the PLLA polymer and the additional polymer compound, the content ratio of the PLLA polymer and the additional polymer compound is selected as appropriate from the range of from 1:99 to 99:1, by weight ratio, and it is preferable that the content ratio is in a range of from 10:90 to 90:10 from the viewpoint of allowing the stereo complex crystals to be incorporated in the member at a greater amount.

The synthesis of the block copolymer may be conducted by a generally used method. Specifically, for example, the block copolymer can be produced by melt mixing or solution mixing these polymers at a predetermined ratio according to the intended block copolymer, followed by solidification, and further performing solid-phase polymerization. Alternatively, the block copolymer can be produced by synthesizing the PLLA polymer in advance, and successively allowing the polymer compound other than polylactic acid to undergo polymerization growth at the molecular terminal thereof. On the contrary, the block copolymer can be produced by synthesizing the polymer compound other than polylactic acid in advance, and successively allowing the L-lactic acid unit to undergo polymerization growth at the molecular terminal thereof.

Regarding the synthesis method of the block copolymer using the PLLA polymer and the additional polymer compound, reference can be made to the methods described in, for example, J. AM. CHEM. SOC. 2002, 124, pages 12761-12773.

One of the synthesis methods is a method using living anion polymerization. Namely, it is a method of successively adding styrene, and thereafter, carrying out living anion polymerization while adding a lactide monomer. Further, a method using polystyrene whose terminal is modified with a hydroxyl group can also be adopted.

Representative polymerization scheme is as follows.

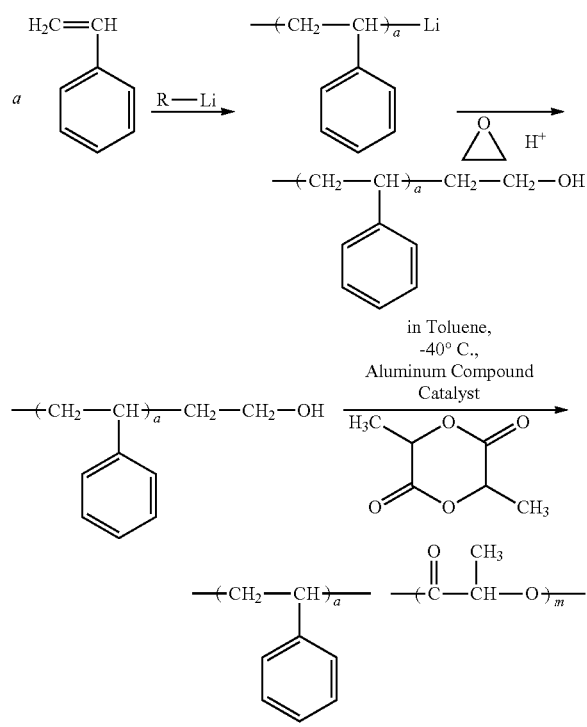

The solid-phase polymerization can be carried out at a temperature equal to or higher than the glass transition temperature (Tg) but the melting point (Tm) or lower, more preferably Tg or higher but a temperature 10° C. lower than Tm or lower, and particularly preferably Tg or higher but a temperature 50° C. lower than Tm or lower. Tg and Tm can be measured using a differential scanning calorimeter (DSC).

The solid-phase polymerization is preferably carried out under reduced pressure, for example, under reduced pressure of from 0.01 hPa to 20 hPa, and preferably from 0.1 hPa to 2 hPa.

Since the polymer compounds containing an L-lactic acid unit or a D-lactic acid unit are chemically bonded together by ester reaction or dehydration condensation reaction, $H_2O$ is by-produced along with the proceeding of the reaction. When they are polymerized under reduced pressure, this by-produced water can be removed to the outside of the reaction system, and reaction equilibrium can be shifted to a polymerization side, which is preferable. When the pressure condition exceeds 20 hPa, the dehydration may become insufficient, and when the pressure condition is lower than 0.01 hPa, a further dehydration effect is not obtained.

The solid-phase polymerization may also be carried out in an inert gas atmosphere such as nitrogen. The solid-phase polymerization time is at least 5 hours, and preferably from 5 hours to 50 hours. The solid-phase polymerization temperature is preferably raised as the degree of polymerization increases.

The reaction apparatus for carrying out solid-phase polymerization is not particularly limited, but, for example, a concentration drier or the like may be used, according to a batch type or continuous type process. Further, a conical drier, drum type heater, or a belt conveyance type or fluid bed type solid-phase polymerization apparatus or the like may also be used.

Preferably, after the solid-phase polymerization, the terminal group is subjected to a capping treatment to improve the thermal stability of the formed polymer compound, and further, the catalyst and an unreacted monomer are removed by re-precipitation or the like.

In the case of using polystyrene as the additional polymer, a commercially available product of a diblock copolymer including PLLA and polystyrene may be used as the block copolymer. For example, as to the block copolymer (PLLA-b-PS) including PLLA and polystyrene, trade name: P2642-SLA (PLLA molecular weight 19,500, PS molecular weight 21,000, total 40,500), trade name: P2643-SLA (PLLA molecular weight 14,000, PS molecular weight 21,000, total 35,000), and trade name: P6511-SLA (PLLA molecular weight 17,000, PS molecular weight 21,000, total 38,000), all manufactured by Polymer Source, Inc., are commercially available products.

The weight average molecular weight of the block copolymer is roughly equal to the sum of the molecular weight of the PLLA polymer and the molecular weight of the additional polymer compound, and accordingly, the weight average molecular weight of the block copolymer used in the present invention is preferably from 20,000 to 2,000,000, and more preferably from 20,000 to 1,000,000. Further, the molecular weight distribution is preferably from 1 to 10, more preferably from 1 to 2, and even more preferably from 1 to 1.5.

In the present invention, with regard to the weight average molecular weight and the molecular weight distribution of the polymer, the values determined by exclusion chromatography using tetrahydrofuran (THF) as a solvent are adopted.

Next, the PDLA homopolymer is prepared. Preparation of the PDLA homopolymer can be conducted in a manner substantially similar to that in the preparation of the PLLA polymer which is used as the raw material of the diblock copolymer, except that a D-lactic acid unit is used as the starting material.

The weight average molecular weight of the PDLA homopolymer used for the preparation of the polymer mixture solution is preferably from 10,000 to 1,000,000, and more preferably from 10,000 to 500,000. Further, the molecular weight distribution is preferably from 1 to 10, more preferably from 1 to 2, and even more preferably from 1 to 1.5.

PDLA homopolymers are also commercially available and, for example, trade name: P8937-LA (molecular weight 19,500), trade name: P3923-LA (molecular weight 16,500), all manufactured by Polymer Source, Inc., and PDLA (molecular weight 230,000) manufactured by PURAC are available.

Next, the obtained block copolymer including the PLLA polymer and the additional polymer compound and the obtained PDLA homopolymer are dissolved in a solvent to prepare a polymer mixture solution.

The mixture ratio of the block copolymer and the PDLA homopolymer used for the preparation of the polymer mixture solution is selected as appropriate from the range of from 1:99 to 99:1, but from the viewpoint of the production efficiency of stereo complex crystals, it is preferable to adjust the mixture ratio such that the content ratio of PLLA polymer contained in the block copolymer and the PDLA homopolymer is within the range of from 10:90 to 90:10.

The solvent used for the preparation of the mixture solution is not particularly limited as long as the solvent can dissolve the above two kinds of polymers, and preferable examples of the solvent include chloroform, tetrahydrofuran, xylene, toluene, benzene, ethylbenzene, dichloroethane, carbon tetrachloride, trichloroethane, dichloromethane, chlorobenzene, methyl ethyl ketone, dichlorobenzene, and trichlorobenzene. One kind of these solvents may be used alone, or two or more kinds of them may be mixed and used as a mixed solvent depending on the purpose. Further, in the case of using a mixed solvent, in addition to the above organic solvents, for example, a solvent having a low boiling point such as methanol or ethanol may be mixed.

The concentration of the polymer compounds in the polymer mixture solution is preferably in a range of from 0.1% by mass to 50% by mass, and more preferably in a range of from 0.1% by mass to 20% by mass.

In the preparation of the polymer mixture solution, the block copolymer and the PDLA homopolymer may be separately dissolved in a solvent and then mixed together, or one of them may be mixed with a solvent and the other may be added to and dissolved in the resulting liquid. Preparation of the solution may be carried out at room temperature (25° C.), but may be carried out by heating at a temperature of from 25° C. to the boiling point of the solvent, as required. The mixing time is preferably in a range of from 1 minute to 24 hours, from the viewpoint of uniformly mixing the two kinds of polymers.

<Mixture Solution Preparing Step (2)>

In the second embodiment of the method for producing stereo complex crystals of polylactic acid of the present invention, the mixture solution preparing step (2) can be conducted in a manner substantially similar to that in the mixture solution preparing step (1) described above, except that a block copolymer including PDLA and a polymer compound other than polylactic acid is used in place of the block copolymer including PLLA and a polymer compound other than polylactic acid, which is used in the mixture solution preparing step (1), and a PLLA homopolymer is used in place of the PDLA homopolymer; and preferable exemplary embodiments (examples and conditions) are also the same.

Also in this step, in the case of using polystyrene as the additional polymer, a commercially available product of a block copolymer (PLLA-b-PS) including PDLA and polystyrene, may be used as the block copolymer. For example, as the block copolymer including PDLA and polystyrene, trade name: P8980C-SLA (PDLA molecular weight 17,000, PS molecular weight 21,000, total 38,000), manufactured by Polymer Source, Inc., and the like are commercially available.

Further, as the PLLA homopolymer, trade name: P8939-LA, manufactured by Polymer Source, Inc. (molecular weight 17,000), trade name: LACEA manufactured by Mitsui Chemicals, Inc. (molecular weight 230,000), and the like, which are described above, may be used.

In the mixture solution preparing step, a polymer compound containing polylactic acid, an additive such as an inorganic filler or a crystal nucleating agent (for example, a substance that accelerates stereo complex crystallization of polylactid acid, or the like), a solvent, a metal compound, an ion, or the like may be further added, as long as the stereo complex formation according to the present invention is not damaged, for the purpose of applying various structures or functions (a porous structure or ionic conductivity) to the molded body described below.

After carrying out the mixture solution preparing step (1) or mixture solution preparing step (2), a step of removing the solvent from the obtained polymer mixture solution is conducted.

Any means can be used for the solvent removing step, but representatively, the following steps (1) to (4) can be cited. In the solvent removing step, the following steps (1) to (4) may be carried out alone or may be carried out by appropriately combining them, and in the case of combining plural steps, the practical order is also arbitrarily selected.

<Step (1) of Removing the Solvent of the Polymer Mixture Solution>

Removal of the solvent may be conducted by, for example, coating the mixture solution on a metal plate whose surface has been treated with polytetrafluoroethylene, and leaving this as it is at room temperature to vaporize the solvent. Alternatively, removal of the solvent may be conducted by casting the mixture solution on a petri dish made of Teflon (registered trademark), and leaving this as it is at room temperature to vaporize the solvent. Further, a mixed solvent may be placed in a container such as the above petri dish or the like, followed by vaporizing the solvent while stirring this using a stirring bar (stirrer), a dynamic stirrer, a stirring rod, or the like. The vaporization of the solvent may be conducted under atmospheric pressure, but from the viewpoint of efficiency, the vaporization of solvent may be conducted under reduced pressure. Regarding the conditions of pressure reduction, since a special device for reducing pressure, such as rotary pump, is not needed and it is possible to realize also by using a vacuum pump, an aspirator, or a diaphragm pump, the pressure is preferably $1\times10^{-3}$ Torr ($1.33\times10^{-1}$ Pa) or higher, and more preferably $1\times10^{-2}$ Torr (1.33 Pa) or higher.

Moreover, it is also possible to obtain a thin film, by spin coating the mixture solution on a metal substrate or the like and let the solvent vaporize in this state, to obtain a thin membrane. In this case, by appropriately setting the number of revolution in the spin coating, a desired membrane thickness can be obtained. For example, when using ACT-300A (trade name) manufactured by ACTIVE Co., Ltd., and performing spin coating at a number of revolution of from 100 rpm to 5,000 rpm, it is possible to form a thin membrane.

In all cases, vaporization or drying of the solvent can be conducted at a temperature in a range of from 0° C. to 200° C., and preferably from 20° C. to 100° C. The drying time is preferably from 1 minute to 72 hours, and more preferably from 1 minute to 24 hours.

Alternatively, it is possible to obtain a thin membrane by making ultra fine fibers from the mixture solution in accordance with an electrostatic spinning method, and vaporizing the solvent while maintaining this state. This method is a method of directly applying a high voltage to a polymer solution or a polymer melt, to form nano fibers by electrical spinning, and specifically, the method described in Biomacromolecules, 2006, Vol. 7, pages 3316-3320 can be applied.

In this method, the polymer mixture solution is placed in a syringe, and the solution is discharged at 0.1 mL/min. In this process, the applied voltage is −25 kV, and the surface of the drum-shaped collection portion (having a diameter of 10 cm) is made to always revolve at 20 cm/min. As a result, fine fiber having a diameter of from 400 nm to 970 nm and an aggregate thereof are obtained.

The fine fibers thus obtained are used for various applications, for example, not only for non-woven fabric, but also for a base material for cell proliferation, a filter, or the like.

The vaporization or drying of the solvent can be conducted at a temperature in a range of from 0° C. to 200° C., and preferably from 20° C. to 100° C. The drying time is preferably from 1 minute to 72 hours, and more preferably from 1 minute to 24 hours.

<Step (2) of Removing the Solvent from the Polymer Mixture Solution>

In the second embodiment of the solvent removing step in the method for producing stereo complex crystals of polylactic acid of the present invention, for example, removal of the solvent may be conducted by filtering the mixture solution. In the removal of the solvent by filtration, a filter having a pore diameter of 10 μm or less, for example, a membrane filter made of Teflon (registered trademark), a porous anodic aluminium oxide membrane, or the like is used from the viewpoint of efficiently collecting the stereo complex crystals. In this process, for the purpose of raising the filtration speed, filtration may be conducted under reduced pressure using an aspirator, a rotary pump, or the like. Regarding the conditions of pressure reduction, the pressure is preferably $1 \times 10^{-3}$ Torr ($1.33 \times 10^{-1}$ Pa) or higher, and more preferably $1 \times 10^{-2}$ Torr (1.33 Pa) or higher.

The removal of the solvent by filtration can be conducted at a temperature in a range of from 0° C. to 200° C., and preferably from 20° C. to 100° C. The filtration time is preferably from 1 minute to 72 hours, and more preferably from 1 minute to 24 hours.

<Step (3) of Removing the Solvent from the Polymer Mixture Solution>

In the third embodiment of the solvent removing step in the method for producing stereo complex crystals of polylactic acid of the present invention, for example, removal of the solvent may be conducted by absorbing only the solvent of the mixture solution using filter paper or the like. In the removal of the solvent by absorption of the solvent, a generally used paper filter may be used, from the viewpoint of absorbing larger amount of solvent to remove rapidly the solvent.

The absorption removal of the solvent using filter paper can be conducted under an environment of a temperature condition of from 0° C. to 200° C., and preferably from 20° C. to 100° C. The absorption time is preferably in a range of from 1 minute to 72 hours, and more preferably from 1 minute to 24 hours.

<Step (4) of Removing the Solvent from the Polymer Mixture Solution>

In the fourth embodiment of the solvent removing step in the method for producing stereo complex crystals of polylactic acid of the present invention, the mixture solution is mixed with a poor solvent that does not dissolve polylactic acid, such as methanol, to separate the polylactic acid, and thereafter, any one of the above solvent removing steps (1) to (3) or a combination of these steps may be carried out to remove the solvent.

There is a case in which a porous body is obtained by carrying out the above solvent removing step, according to the combination of the additional organic polymer and the solvent. This is caused because, due to the fact that the additional organic polymer in the bock copolymer is likely to hold the solvent, the component other than polylactic acid involves the solvent and is in the swelled state in the former period of the solvent removal process, even if the polylactic acid component forms stereo complex crystals and solidifies, and therefore, the solvent is selectively removed from the component other than polylactic acid in the latter period of the solvent removal process, and thus this region becomes a hole. Alternatively, depending on the solvent used, the amorphous region (the region of polylactic acid other than the stereo complex crystals) of the polylactic acid component involves the solvent, and when the solvent vaporizes, a porous structure is formed. In such a case, the polymer mixture becomes a porous body, and can be suitably utilized as a porous body which is configured to include the polylactic acid of the present invention, which is described below in detail. Further, the porous body formed from the polymer mixture may further be heat treated by performing a heat treatment step which is subsequently performed as desired, to provide a porous body containing stereo complex crystals at a higher ratio.

In the above solvent removing step, a polymer compound containing polylactic acid, an additive such as an inorganic filler or a crystal nucleating agent (for example, a substance that accelerates stereo complex crystallization of polylactid acid, or the like), a solvent, a metal compound, an ion, or the like may be further added, for the purpose of applying various structures or functions (a porous structure or ionic conductivity) to the molded body described below, as long as the stereo complex formation according to the present invention is not damaged.

It should be noted that, in the step of fabricating a molded body, which is described below, in the case of molding the polymer mixture in the state of being swelled by the solvent, it is not necessary to thoroughly remove the solvent in the solvent removing step, and the polymer mixture involving the solvent may be used for fabricating a molded body or a synthetic fiber by, for example, kneading, extrusion, injection molding, press molding, melt spinning, wet spinning, electrostatic spinning, or the like.

<Step of Heat Treating the Polymer Mixture Obtained after the Solvent Removing Step>

After carrying out the step of removing the solvent from the mixture solution, the obtained polymer mixture generally becomes a membrane or powder formed from the polymer mixture, and this is a membrane or powder including stereo complex crystals of polylactic acid at a high ratio. After the solvent removal step, it is preferable to carry out a heat treatment step of heat treating the polymer mixture, from the viewpoint of raising the content ratio of stereo complex crystals.

The polymer mixture may be subjected to heat treatment in a DSC oven, by placing the polymer mixture in a sample pan for differential scanning calorimeter (DSC) measurement. Further, an oven, a press molding apparatus, an air thermostat, or an oil bath, which can be set to a constant temperature, or the like may also be used.

The polylactic acid of the present invention may be a substance prepared by performing heat treatment on the membranous or powdery molded body obtained through the solvent removing step, or in the case of producing a molded body having different form, a synthetic fiber, a porous body, or an ion conductor by using, as the raw material, the polymer mixture or the molded body obtained by removing the solvent from the polymer mixture, a form of a molded body, a synthetic fiber, a porous body, or an ion conductor may be formed in advance by using the polymer mixture or the like, and then a heat treatment may be carried out, as described below.

The heat treatment step can be carried out at a temperature within a range of from 100° C. to 300° C., the range being equal to or higher than the glass transition temperature (Tg) of the polylactic acid but the melting point (Tm) or lower, and more preferably from 150° C. to 250° C. The heat treatment time is preferably from 1 minute to 72 hours, and more preferably from 1 hour to 24 hours.

<Polylactic Acid>

After removing the solvent, the polymer mixture obtained is a polylactic acid, which contains stereo complex crystals at a high ratio and has a form of a membrane or powder, and contains an additional polymer compound derived from the block copolymer used as a raw material.

The existence of the stereo complex crystals in the polylactic acid can be confirmed by wide-angle X-ray diffraction measurement (WAXD) or DSC measurement. The content ratio of the stereo complex crystals in the polylactic acid obtained by the production method of the present invention is 10% by mass or higher with respect to the total amount of the polylactic acid, and more preferably from 10% by mass to 100% by mass. Further, the content ratio of α crystal is preferably 20% by mass or lower, and it is more preferable that α crystal is not contained at all.

In the polylactic acid obtained by the production method of the present invention, an organic polymer (an additional polymer compound) which has a different structure from that of polylactic acid forms a block copolymer with polylactic acid, and this block copolymer is contained in the polylactic acid of the present invention. Namely, when the polylactic acid includes, as a block copolymer, an organic polymer having a different structure from that of polylactic acid, it is detected that the polylactic acid is obtained by the production method of the present invention.

The content ratio of the organic polymer having a different structure from that of polylactic acid is from 1% by mass to 99% by mass, and it is preferable that the content ratio is from 10% by mass to 90% by mass.

Here, it may be confirmed that polylactic acid and an organic polymer having a different structure from that of polylactic acid form a block copolymer, by the following method. Further, from the ratio of signal intensities, the component ratio of polylactic acid and the organic polymer having a different structure from that of polylactic acid can be determined.

1. Method of Dissolving in a Solvent that Dissolves Polylactic Acid and the Additional Polymer Compound, and Performing NMR Measurement After dissolving in a solvent that dissolves both the additional polymer compound and polylactic acid, which form the block copolymer, NMR measurement of this solution is performed. When this solution contains the raw materials that form the block copolymer including polylactic acid and the additional polymer compound, a signal arising from the "junction point" of the polylactic acid and the polymer compound other than polylactic acid is observed besides the signals arising from the polylactic acid homopolymer and the polymer compound other than polylactic acid. Herewith, it is confirmed that the targeted sample contains a block copolymer including polylactic acid and an additional polymer compound. Further, by comparing the intensities of the NMR signals, the composition ratio of the polylactic acid and the additional polymer compound can be determined. Note that, since, in the diblock copolymer, there is only one junction point per one molecular chain of the block copolymer and the number of the junction points is few, the signal corresponding to the junction point is very weak, but by integrating the data in accordance with a method of extending the NMR measurement time or the like, the measurement can be conducted.

2. Method of Dissolving in a Solvent that Dissolves Polylactic Acid and the Additional Polymer Compound, then Pouring the Resulting Solution into a Solvent that does not Dissolve Polylactic Acid but Dissolves the Additional Polymer Compound, to Separate the Polylactic Acid, and Performing NMR Measurement Thereof After dissolving in a solvent that dissolves both the additional polymer compound and polylactic acid, the resulting solution is poured into a solvent that does not dissolve polylactic acid but dissolves the additional polymer compound, and the resulting precipitates are gathered, and the precipitates are again dissolved in a solvent that dissolves both the above components, to perform NMR measurement. When polylactic acid forms a block copolymer together with an additional polymer compound, signals arising from polylactic acid and the additional polymer compound are observed, whereby the existence of the additional polymer compound is confirmed.

When a signal arising from an additional polymer compound is observed together with the signal arising from polylactic acid, it is confirmed that polylactic acid and an additional polymer compound are included. More specifically, for example, in a case in which a block copolymer containing polylactic acid and polystyrene is included, after dissolving in chloroform, the resulting solution is poured into cyclohexane (which does not dissolve polylactic acid), and the precipitates are gathered. Then, the cyclohexane may be removed from the precipitates, and then these precipitates may be dissolved in chloroform, followed by performing NMR measurement. Further, by comparing the intensities of the NMR signals, the composition ratio of the polylactic acid and the additional polymer compound can be determined.

3. Method of Performing Soxhlet Extraction Using a Solvent that does not Dissolve Polylactic Acid but Dissolves the Additional Polymer Compound, to Remove the Additional Polymer Compound, and Performing NMR Measurement of the Residue Using a solvent that does not dissolve polylactic acid but dissolves the additional polymer compound, the molded body is sufficiently subjected to Soxhlet extraction, and the residue is dissolved in a solvent that dissolves both the above components, followed by performing NMR measurement of this solution. When polylactic acid forms a block copolymer together with an additional polymer compound, signals arising from polylactic acid and the additional polymer compound are observed, whereby the existence of the additional polymer compound is confirmed.

For example, in a case in which a copolymer containing polylactic acid and polystyrene is used, first, Soxhlet extraction may be carried out using cyclohexane (which does not dissolve polylactic acid), then the residue may be dissolved in chloroform, and then NMR measurement of this solution may be conducted. Further, by comparing the intensities of the NMR signals, the composition ratio of the polylactic acid and the additional polymer compound can be determined.

In the present invention, the existence and content of the additional polymer compound are confirmed using the Method 1 described above.

The polylactic acid obtained by the method for producing stereo complex crystals of polylactic acid of the present invention has a melting point measured by DSC of 220° C. or higher, preferably from 240° C. to 260° C., and thus, the polylactic acid according to the present invention has excellent heat resistance as compared with polylactic acids obtained by a known production method.

The polylactic acid of the present invention, which is obtained by the production method of the present invention, has a melting point of 220° C. or higher, and therefore, like the generally used polyethylene terephthalate (PET) which has a melting point of around 250° C., the polylactic acid of the present invention is useful in various resin molded bodies, synthetic fibers, and the like. Further, using the characteristics, this polylactic acid is also suitably used, for example, for the formation of porous bodies, ion conductors, and the like.

<Molded Body>

Hereinbelow, the molded body which is configured to include the polylactic acid of the present invention is explained.

The molded body of the present invention contains the polylactic acid of the present invention and an additional polymer compound that forms a block copolymer with polylactic acid. Only the polylactic acid of the present invention and the additional polymer compound that forms a block copolymer with polylactic acid may be used as the molding resins, or these components may be used by blending with a polymer compound containing polylactic acid, an additive such as an inorganic filler or a crystal nucleating agent (for example, a substance that accelerates stereo complex crystallization of polylactid acid, or the like), a solvent, an ion, a metal compound, or the like.

Examples of the polymer compound, which can be used in combination and is other than polylactic acid, include other thermoplastic resins, thermosetting resins, and soft thermoplastic resins; and one or more of these polymer compounds can be added. Concerning the timing of addition, these components may be added during the step of preparing the polymer mixture solution or the step of removing the solvent from the polymer mixture solution, as long as the formation of stereo complex crystals of polylactic acid in the present invention is not damaged.

However, when the amount of the organic polymer compound to be used in combination is large, the total weight fraction of the stereo complex crystals becomes low, and therefore, it is preferable that the molded body contains polylactic acid as the main component. Namely, it is preferable that polylactic acid accounts for 10% by mass or higher of the molding resins, and polylactic acid may account for 99% by mass of the molding resins.

Further, examples of the inorganic additives, such as the inorganic filler, which may be used in the present invention, include a metal compound, an ion, a light-resisting agent, an antioxidant, and a crystal nucleating agent for polylactic acid (for example, a substance that accelerates stereo complex crystallization, or the like), and the inorganic additive may also be added during the step of preparing the polymer mixture solution or the step of removing the solvent from the polymer mixture solution.

In a case in which a member having a desired form, such as the form of a membrane or powder, is obtained after the solvent removing step, the member may be designated as a membranous or powdery molded body containing polylactic acid, without further adding a molding step. As described above, such a molded body is also included in the molded body of the present invention. Further, in a case in which a member having a desired form, such as the form of a membrane or powder, is obtained after the heat treatment step, the member may be designated as a membranous or powdery molded body containing polylactic acid, without further adding a molding step.

The molded body of the present invention contains the polylactic acid of the present invention, and further contains, as described above, an additional polymer compound that forms a block copolymer with polylactic acid. Incorporation of the additional polymer compound makes it possible to obtain a molded body also having a function that is originally possessed by the additional polymer compound, such as thermal resistance, ionic conductivity, or the like.

The molded body of the present invention is configured to include the polylactic acid of the present invention, but the molded body of the present invention may include components such as a polymer compound (including polylactic acid) which is the same as or different from the polymer compound other than polylactic acid, which forms a block copolymer with polylactic acid, an inorganic substance, a solvent, or the like, as a constituent material or an additive, as long as the molded body of the present invention includes the polylactic acid of the present invention in at least a portion of the constituent material thereof.

Accordingly, not only the polylactic acid of the present invention, but also a molded body obtained by molding the polymer mixture used for the production of the polylactic acid, a molded body which is obtained by heat treating the molded body obtained by molding a substance including the polymer mixture, and a molded body including a synthetic fiber, a porous body, or an ion conductor, each of which is obtained from the polylactic acid of the present invention and is described in detail below, are included in the molded body of the present invention.

In the production of the molded body, the polylactic acid of the present invention may be used like a resin material generally used in the production of a molded body. In the case of imparting some functions to the molded body of the present invention, as needs arise, known resin materials may be used by blending, or known additives or solvents may also be used.

For example, for producing the molded body, a filler may be added as a reinforcing agent to the polylactic acid of the present invention, or to a molded body containing the polylactic acid. Either an inorganic filler or an organic filler may be used as the filler.

Examples of the inorganic filler include glass fiber, graphite fiber, carbon fiber, metal fiber, potassium titanate whisker, aluminum borate whisker, magnesium-based whisker, silicon-based whisker, wollastonite, sepiolite, zonolite, ellestadite, gypsum fiber, silica fiber, silica alumina fiber, zirconia fiber, silicon nitride fiber, boron fiber, glass flake, non-swelling mica, graphite, metal foil, talc, clay, mica, sericite, bentonite, kaolin, magnesium carbonate, barium sulfate, magnesium sulfate, aluminum hydroxide, magnesium oxide, hydrotalcite, magnesium hydroxide, gypsum, and dawsonite.

Examples of the organic filler include natural fibers, para-oriented aramide fiber, polyazole fiber, polyarylate, polyoxybenzoic acid whisker, polyoxynaphthoyl whisker, and cellulose whisker.

As to these fillers, fibrous, plate-like, or needle-like fillers can be used. Among these fillers, fibrous inorganic fillers are preferable, and glass fiber is particularly preferable. Further, the aspect ratio of the filler is preferably 5 or higher, and more preferably 10 or higher. The aspect ratio of the filler is particularly preferably 100 or higher. The term "aspect ratio" indicates a value obtained by dividing the length of a fiber by the diameter of the fiber in the case of a fibrous filler, and a value obtained by dividing the length in the long-period direction by the thickness in the case of a plate-like filler.

The elastic modulus of the filler is preferably 50 GPa or higher.

In the case of using a fibrous filler as the filler, the fibrous filler preferably has a single-fiber strength of 200 MPa or higher and more preferably 300 MPa or higher. When the single-fiber strength is within this range, the fibrous filler has sufficient mechanical properties as a composite, and further, a molded body having surfaces with excellent outside appearance is obtained even if a required amount is added, since a sufficient reinforcing effect can be obtained even though the amount of the filler to be mixed is reduced.

The fiber diameter of the fibrous filler is in a range of from 0.1 μm to 1 μm, and preferably in a range of from 1 μm to 500

µm. The aspect ratio (length÷diameter), which is the ratio of a length of the fiber to the diameter, is preferably 50 or higher. When the aspect ratio is within this range, the resin and the fiber can be mixed together well, and a molded product having good physical properties can be obtained by compounding. The aspect ratio is more preferably from 100 to 500, and even more preferably from 100 to 300.

Further, the polylactic acid that forms the molded body may contain, other than the above filler, one kind or two or more kinds of known additives, for example, a plasticizer, an antioxidant, a light stabilizer, an ultraviolet ray absorbent, a thermostabilizer, a lubricant, a release agent, an antistatic agent, a flame retardant, a foaming agent, a packing material, an antibacterial/antifungal agent, a nucleating agent (a substance that accelerates stereo complex crystallization of polylactic acid, or the like), a colorant including a dye and a pigment, or the like, in addition to the above filler, depending on the purposes.

Moreover, in the case of using the molded body as an ion conductor, the molded body may contain, together with the polylactic acid, a substance having ionic conductivity, for example, a metal such as lithium or an ion thereof, an ion of, for example, an oxide, a chloride, a fluoride, a complex, or the like, or a metal compound.

Further, in the steps for obtaining a molded body, a synthetic fiber, or a porous body, which are described below, in the case of allowing the polymer mixture to be in the sate of being swelled by a solvent, the solvent may be contained, or the solvent may be newly added. In the case of newly adding a solvent, the solvent may be the same as or different from the solvent used in the preparation of the polymer mixture solution. Further, the above two solvents or two or more kinds of different solvents may be contained. In the case of containing a solvent which is the same as the solvent used in the preparation of the polymer mixture solution, it is not necessary to thoroughly remove the solvent in the solvent removing step, and the polymer mixture in the state of involving the solvent may be used for fabricating a molded body or a synthetic fiber by, for example, kneading, extrusion, injection molding, press molding, melt spinning, wet spinning, electrostatic spinning, or the like. The solvent used in this process is preferably a solvent which causes to swell polylactic acid and the additional polymer compound that forms a block copolymer with polylactic acid, or the above-described polymer compound (including polylactic acid) which is additionally added, and the like. Note that, with regard to the polylactic acid, the solvent used in the above mixture solution preparing step can be suitably used.

The thus formed resin composition obtained by adding an additional component to the polylactic acid of the present invention, or the polymer mixture or molded body containing the polylactic acid exhibits sufficient strength and heat resistance, and can be suitably used for the formation of a molded body.

Further, in the production of a molded body, the polymer mixture, which is prepared by removing the solvent from the mixture solution obtained in the step of producing the polylactic acid and contains the polylactic acid, may be directly used for the production of a molded body. This is because, since the polymer mixture contains the polylactic acid of the present invention at a high concentration, the obtained molded body is made to contain the polylactic acid of the present invention by means of directly producing a molded body, other than by means of producing the polylactic acid by using the polymer mixture as a raw material and processing it into a molded body.

Depending on the application purpose, a molded body having a form selected as appropriate is produced, but as to the forming method of the molded body, any techniques for producing a molded body using a resin composition which is generally used may be applied.

In a case in which, in the solvent removing step, the solvent contained in the component other than polylactic acid is removed and the removed portion becomes a fine hole, the molded body is suitably used as a porous body. The thus obtained porous body containing the polylactic acid of the present invention may further be subjected to heat treatment.

On the other hand, since it is thought that, in the polymer mixture or in the molded body, polylactic acid and an additional organic polymer compound form a phase separated structure in nano-meter order, in a case in which fine holes are not formed in the solvent removing step and a molded body that does not have any voids is obtained, the polylactic acid of the present invention is suitably used as a transparent film or the like.

As described above, the obtained molded body may further be subjected to heat treatment, regardless the form of the molded body. The heat treatment may be conducted in a DSC oven by placing the molded body to be heat treated in a sample pan for DSC measurement, or the heat treatment may be conducted using an oven, a press molding apparatus, an air thermostat, an oil bath, or the like, as long as the apparatus can be set to a constant temperature. The heat treatment temperature can be set at a temperature within a range of from 60° C. to 300° C., the range being equal to or higher than the glass transition temperature (Tg) but the melting point (Tm) or lower, and more preferably from 80° C. to 250° C. The heat treatment time is preferably from 1 minute to 72 hours, and more preferably from 1 hour to 24 hours.

By performing such a heat treatment, the content of the stereo complex crystals obtained is further increased.

As described above, by using the composition including the polylactic acid of the present invention, from the aspects according to the molding method, molded bodies such as a press molded product, an injection molded product, an extrusion molded product, a vacuum-pressure molded product, and a blow molded product; from the aspects of its form, a film, a sheet, a plate-like body, a structure, a non-woven fabric, a fiber, cloth, and a complex with other material; and from the aspects of its use, an agricultural material, a fishing material, a civil engineering/construction material, stationary, a medical supply, various kinds of containers, and other molded bodies can be obtained, respectively. Molding can be carried out by a commonly used method, and there is no particular limitation on the molding method.

For example, after the solution obtained by the above-described mixture solution preparing step is cast, the solvent is vaporized to remove the solvent through performing the above-described solvent removing step, thereby preparing a film-shaped product, which is then heat treated at a temperature in a range of from 60° C. to 300° C., to produce a film having excellent heat resistance.

Further, these molded bodies may be subjected to stretching processing for applying molecular orientation, such as uniaxial stretching, simultaneous biaxial stretching, successive biaxial stretching, roll rolling (stretching), or extrusion stretching.

Examples of the use of the molded body include structural materials, construction materials, fitting materials, temporary construction materials, various auto parts, interior finishing materials, sheets, and mats, which should have strength and heat resistance. The molded body of the present invention is suitably used in a wide range of use, and has a wide range of application.

Furthermore, in these molding steps, in the case of allowing the polymer mixture to be in the sate of being swelled by a solvent, the solvent may be contained, or the solvent may be newly added. In the case of newly adding a solvent, the solvent may be the same as or different from the solvent used in the preparation of the polymer mixture solution. Further, the above two solvents or two or more kinds of different solvents may be contained.

By subjecting the polymer mixture, which contains a solvent and is in the state of being swelled, to kneading, extrusion, injection molding, press molding, stretching (uniaxial or biaxial), or the like, there is a case in which the plastic deformation property or stretching property of the polymer mixture is enhanced, and a molded body having high performance is obtained more easily. In this case, it is not necessary to thoroughly remove the solvent in the solvent removing step, and the polymer mixture in the state of involving the solvent may be subjected to various kinds of molding as described above. The solvent used in this process is preferably a solvent which causes to swell polylactic acid and the additional polymer compound that forms a block copolymer with polylactic acid, or the above-described polymer compound (including polylactic acid) which is additionally added, and the like. Note that, with regard to the polylactic acid, the solvent used in the mixture solution preparing step can be suitably used.

After molding, these obtained molded bodies may further be subjected repeatingly to the mixture solution preparing step, the solvent removing step, the heat treatment step, the molding step, the perforating step, the ion source applying step, or the like. In this case, the frequency and order may be arbitrarily selected. For example, by dissolving or swelling the obtained molded body again in a solvent and performing a mixture solution preparing step, followed by performing a solvent removing step, there is a case in which stereo complex crystals are formed at a higher ratio. In this case, even though the conditions for dissolving the molded body in a solvent are the same as the conditions of the first mixture solution preparing step, there is a case in which the once-formed stereo complex crystal does not dissolve thoroughly and remains, and this acts as a nucleus in the solvent removing step, the heat treatment step, the molding step, or the spinning step, resulting in the formation of stereo complex crystals at a higher ratio.

In the following, particularly preferable embodiments in the molded body including the polylactic acid of the present invention are described.

<Synthetic Fiber>

Since the polylactic acid of the present invention has excellent heat resistance, it can be suitably used for synthetic fibers. The synthetic fiber of the present invention is configured to include the polylactic acid of the present invention.

The polylactic acid of the present invention has excellent processing property, and therefore, like generally used synthetic fiber materials, the polylactic acid of the invention can be easily molded into a single fiber form by melt spinning, wet spinning, or the like, and can be processed as it is to the form of fiber by using a widely used apparatus. Further, by selecting a spinning metal mold, a modified cross-section fiber or the like can also be formed easily.

Further, these fibers may be subjected to stretching processing for applying molecular orientation, such as uniaxial stretching, roll rolling (stretching), extrusion stretching, or the like.

The diameter of the synthetic fiber of the present invention is arbitrarily selected from the range of from 0.1 µm to 1 mm, and is preferably in a range of from 1 µm to 500 µm.

Further, as another preferable production method to obtain the synthetic fiber of the present invention, an electrostatic spinning method is described. The method is a method of directly applying a high voltage to a polymer solution or a polymer melt, to form nano fibers by electrical spinning, and specifically, a method described in Biomacromolecules, 2006, Vol. 7, pages 3316-3320 can be applied.

In this method, after forming a cast film using the polylactic acid of the present invention, this cast film is dissolved in chloroform (4.0 g/mol), then the resulting solution is placed in a syringe and discharged at 0.1 mL/min. In this process, the applied voltage is −25 kV, and the surface of the drum-shaped collection portion (having a diameter of 10 cm) is made to always revolve at 20 cm/min. As a result, fine fibers having a diameter of from 400 nm to 970 nm and an aggregate thereof are obtained.

The fine fibers thus obtained are used for various applications, for example, not only for non-woven fabric, but also for a base material for cell proliferation, a filter, or the like.

Since the synthetic fiber of the present invention has a melting point of 240° C. or higher, in a case in which clothing such as a shirt is produced by using this fiber, processing such as ironing or heat press can be conducted.

Therefore, the synthetic fiber of the present invention has excellent strength and excellent heat resistance when using, and also is useful as a fiber or fiber product derived from plants.

Further, a renewed molded body may be produced using the synthetic fiber including the polylactic acid. Examples thereof include a molded body obtained by using woven fabric or non-woven fabric made from the synthetic fiber of the present invention, and the like.

Furthermore, in the step for spinning these fibers, in the case of allowing the polymer mixture to be in the sate of being swelled or dissolved by a solvent, the solvent may be contained, or the solvent may be newly added. In the case of newly adding a solvent, the solvent may be the same as or different from the solvent used in the preparation of the polymer mixture solution. Further, the above two solvents or two or more kinds of different solvents may be contained. By subjecting the polymer mixture, which contains a solvent and is in the state of being swelled or dissolved, to wet spinning, melt spinning, electrostatic spinning, or the like, there is a case in which a fiber of the polymer mixture is obtained more easily. In this case, it is not necessary to thoroughly remove the solvent in the solvent removing step, and the polymer mixture in the state of involving the solvent may be subjected to various kinds of molding as described above. The solvent used in this process is preferably a solvent which causes to swell or dissolves polylactic acid and the additional polymer compound that forms a block copolymer with polylactic acid, or the above-described polymer compound (including polylactic acid) which is additionally added, and the like. Note that, with regard to the polylactic acid, the solvent used in the mixture solution preparing step can be suitably used.

After production, these obtained fibers may further be subjected repeatingly to the mixture solution preparing step, the solvent removing step, the heat treatment step, the molding step, the perforating step, the ion source applying step, or the like. In this case, the frequency and order may be arbitrarily selected. For example, by dissolving or swelling the obtained molded body again in a solvent and performing a mixture solution preparing step, followed by performing a solvent removing step, there is a case in which stereo complex crystals are formed at a higher ratio. In this case, even though the conditions for dissolving the molded body in a solvent are the same as the conditions of the first mixture solution preparing step, there is a case in which the once-formed stereo complex crystal does not dissolve thoroughly and remains, and this acts as a nucleus in the solvent removing step, the heat treatment step, the molding step, or the spinning step, resulting in the formation of stereo complex crystals at a higher ratio.

<Porous Body>

Since polylactic acid and the additional organic polymer compound form a phase separated structure in nano-meter order in the polymer mixture or in the molded body, the polylactic acid of the present invention can be suitably used also in the production of a porous body. The porous body of the present invention is a porous body obtained by decomposing and removing the additional polymer compound that forms a block copolymer with polylactic acid, or other components (other polymer component or additives such as an inorganic filler) from the polymer mixture, the molded body, or the synthetic fiber, each including the polylactic acid of the present invention.

The porous body of the present invention is obtained by preparing or producing a polymer mixture or a molded body in a desired form including the form of a membrane, a film, a sheet, and a fiber, each of which is configured to include the polylactic acid of the present invention, and thereafter, removing at least a portion of the component which is other than polylactic acid and is contained in the polymer mixture or the molded body, by a means such as acid etching treatment, ultrasonic wave treatment in a solvent, or the like.

Further, in the step for producing a porous body, in the case of allowing the polymer mixture to be in the sate of being swelled by a solvent, the solvent may be contained, or the solvent may be newly added. In the case of newly adding a solvent, the solvent may be the same as or different from the solvent used in the preparation of the polymer mixture solution. Further, the above two solvents or two or more kinds of different solvents may be contained. A porous body may be obtained by a method including subjecting the polymer mixture which contains a solvent and is in the state of being swelled, to kneading, extrusion, injection molding, press molding, stretching (uniaxial or biaxial), or the like, to prepare a mixture of the polymer mixture and the solvent, and thereafter, removing the solvent with reference to the above solvent removing step. The solvent used in this process is preferably a solvent which causes to swell polylactic acid and the additional polymer compound that forms a block copolymer with polylactic acid, or the above-described polymer compound (including polylactic acid) which is additionally added, and the like. Note that, with regard to the polylactic acid, the solvent used in the mixture solution preparing step can be suitably used.

In the formation of the porous body of the present invention, such a perforating treatment by removing the solvent and the above-described perforating treatment by decomposing and removing the polymer compound other than polylactic acid may be combined, or may be performed, repeatingly. In this case, the frequency and order of these perforating steps may be arbitrarily selected.

After preparation, these obtained porous bodies may further be subjected repeatedly to the mixture solution preparing step, the solvent removing step, the heat treatment step, the molding step, the perforating step, the ion source applying step, or the like. In this case, the frequency and order may be arbitrarily selected. For example, by dissolving or swelling the obtained molded body again in a solvent and performing a mixture solution preparing step, followed by performing a solvent removing step, there is a case in which stereo complex crystals are formed at a higher ratio. In this case, even though the conditions for dissolving the molded body in a solvent are the same as the conditions of the first mixture solution preparing step, there is a case in which the once-formed stereo complex crystal does not dissolve thoroughly and remains, and this acts as a nucleus in the solvent removing step, the heat treatment step, the molding step, or the spinning step, resulting in the formation of stereo complex crystals at a higher ratio.

The portion where the component other than polylactic acid has been removed becomes a void, and a porous body of polylactic acid, which has a large number of fine voids in the interior thereof, is formed. As the means for removing the other component, the above acid etching treatment and ultrasonic wave treatment are exemplified, but the invention is not limited to the methods, and any method may be used as long as the component other than polylactic acid is substantially removed by the method. Further, these methods may be performed in combination or may be performed repeatingly. In the case of combining plural means, the order and frequency thereof may be arbitrarily selected. In addition, these plural treatments may be performed at the same time.

Moreover, the porous body obtained may be further subjected to stretching processing for applying molecular orientation, such as uniaxial stretching, simultaneous biaxial stretching, successive biaxial stretching, roll rolling (stretching), or extrusion stretching. The stretching processing may be performed prior to the above-described step of decomposing and removing the component other than polylactic acid.

The pore size of the porous body of the present invention is a nano-order pore size, owing to the phase separated structure of the block copolymer needed to produce stereo complex crystals of polylactic acid, and therefore, the porous body of the present invention is a porous body having nano-sized fine pores. This porous body also has excellent strength and excellent heat resistance owing to the physical properties of polylactic acid, like the molded body or the synthetic fiber of the present invention. Further, since polylactic acid has biocompatibility, these porous bodies can be suitably utilized as medical supplies such as a blood purifying filter, a foothold material for cell proliferation, or a separation membrane for implantable glucose sensor.

For example, the present inventors have found that a polymer porous membrane can be suitably applied to a separation membrane used in implantable glucose sensor, which is a medical equipment useful for controlling the blood sugar level of diabetics [ACS Nano, 2009, Vol. 3, pages 924-932], and the porous body configured to include the polylactic acid of the present invention is also suitably utilized in the same application. As to the porous body configured to include the polylactic acid of the present invention, it can be said that, since the porous body has excellent biocompatibility, it is more suitably used for implantable applications.

Various attempts have been made to form a porous body of polylactic acid in known literatures, and for example, in [Biomacromolecules, 2009, Vol. 10, pages 2053-2066], a method for producing a porous body structure, the method including melt kneading a poly-L-lactic acid (PLLA) homopolymer and a polystyrene (PS) homopolymer, to obtain a molded film, and then selectively extracting only the PS component using cyclohexane, is described. However, the pore diameter size of the porous body obtained by this method is a micro-order pore size, and under the existing circumstances, a porous body having a nano-order fine pore diameter such as the porous body of the invention has not been obtained yet.

Meanwhile, as the method for extracting only the PS component from the micro-phase separated structure formed from the block copolymer, there is a method of dipping in an excess amount of fuming nitric acid at room temperature to undergo degradation and removal. According to this method, the pore diameters of the fine pores can be appropriately adjusted by adjusting the dipping time (from 1 minute to 1 hour). This method is described in detail in the report written by the present inventors [Macromolecules, 2006, Vol. 39, pages 3971-3974], and in practice, the method described in the literature can be referenced.

Further, regarding the ultrasonic degradation of PS, it is known that the molecular weight is reduced to one severalth, when processed for about 3 hours at room temperature in the state of being dissolved in the solvent. In the present invention, by dipping in a solvent that does not dissolve polylactic acid but dissolves the PS component, only the PS component can be decomposed and removed, while suppressing the degradation of the polylactic acid component. The method of decomposing PS using ultrasonic wave is described in detail in, for example, Polymer Degradation and Stability, 2000, Vol. 68, pages 445-449, and in practice, the method described in the literature can be referenced.

<Ion Conductor>

Further, since the polylactic acid of the present invention forms a phase separated structure in nano-meter order with the additional organic polymer compound in the polymer mixture or in the molded body, the polylactic acid of the present invention can be suitably used also in the production of an ion conductor. The ion conductor of the present invention is an ion conductor obtained by applying an ion source to the component other than polylactic acid in the polymer mixture containing the polylactic acid of the present invention or the molded body (in this molded body, those in the form of a membrane, a synthetic fiber, or the like are included) which is configured to include the polylactic acid. Further, in the porous body which is configured to include the polylactic acid, in a case in which the component other than polylactic acid remains as the material that forms the porous body, an ion conductor can be obtained by applying an ion source to the remaining component other than polylactic acid.

It should be noted that, in a case in which the polymer component, which forms a block copolymer with polylactic acid and has a different structure from that of polylactic acid, originally contains an ion source, such as polystyrenesulfonic acid, a post-treatment for applying an ion source may not be conducted, or the post-treatment may be conducted to further increase the concentration of the ion source.

Further, in a case in which a component that becomes an ion source has been already added in the step of preparing the polymer mixture solution or in the step of removing the solvent contained in the polymer mixture solution, the molded body obtained may be used as an ion conductor without subjecting the molded body to a treatment for applying an ion source.

The ion conductor of the present invention is obtained by, first, preparing or producing a membranous or powdery molded body formed from the polymer mixture which is configured to include the polylactic acid of the present invention or a molded body which is formed by including the polymer mixture as a portion of the raw material and has a desired form including the form of a membrane, a film, a sheet, and a fiber, and thereafter, applying an ion source to the component which is other than polylactic acid and is contained in the polymer mixture or the molded body. Here, explaining the case of using polystyrene as the component other than polylactic acid as an example, when performing a chemical treatment of allowing the polymer mixture containing polylactic acid and polystyrene or the molded body to react with chlorosulfonic acid in an appropriate solvent, the polystyrene contained in the molded body or the like is changed to polystyrenesulfonic acid to become an ion source. In this way, an ion source is introduced into the component other than polylactic acid and, as a result, an ion conductor in which an ionic conduction channel and the polylactic acid component are combined in nano-meter size is formed.

Furthermore, after obtaining the ion conductor, the obtained ion conductor may be further subjected to stretching processing for applying molecular orientation, such as uniaxial stretching, simultaneous biaxial stretching, successive biaxial stretching, roll rolling (stretching), or extrusion stretching. With regard to the molded body which contains polylactic acid that becomes a raw material of an ion conductor, the stretching processing may be performed prior to the conduction of chemical treatment or addition treatment for applying an ion source to the component other than polylactic acid, and also in the case of performing the stretching processing first, and then introducing an ion source, molecular orientation can be applied to the ion conductor, similar to the case of forming an ion conductor first and then performing the stretching processing.

Since the ion conductor exhibits a structure having micro-sized ion sources, a high ionic conductivity can be obtained, and also, since the ion conductor of the present invention is configured to include a polylactic acid having a high melting point, the ion conductor can be suitably utilized as a fuel cell membrane that operates at a high temperature equal to or higher than 200° C. Further, since polylactic acid is synthesized from lactic acid which is a plant-based raw material, it is advantageous in that a fuel cell membrane which does not use a petroleum-based raw material can be produced in future, and the like.

EXAMPLES

Hereinbelow, the present invention is described more specifically with reference to Examples, but the invention is by no means limited to the following Examples unless they are beyond the scope of the invention.

Example 1

Synthesis Example 1

Synthesis of Poly-L-Lactic Acid (PLLA)/Polystyrene (PS) Diblock Copolymer 1-1. Synthesis of Hydroxy Terminated Modified Polystyrene (PSOH)

Polymerization was conducted in a 2 L five-necked flask with a stirring bar coated with Teflon (registered trademark). Three among the five necks were each equipped with a glass stopper through an O-ring made of fluororesin, the fourth neck was equipped with a thermometer, and the last one was equipped with a three-necked Y-tube. This three-necked Y-tube was equipped with an argon/pressure reduction branch pipe, a manometer, and a septum stopper. The pressure inside this reaction vessel was reduced to about $1 \times 10^{-3}$ Torr ($1.33 \times 10^{-1}$ Pa), and the reaction vessel was heated at 275° C. for 16 hours. Thereafter, the reaction vessel was cooled to room temperature, and then, under a stream of argon, a burette with pure styrene (98.7 g, 0.949 mol), a burette with pure ethylene oxide (10.0 g, 0.227 mol), and a burette with 0.7 L of pure cyclohexane were attached to the three necks, respectively. In this process, the burette with styrene and the burette with cyclohexane were directly attached to the reaction vessel, but the burette with ethylene oxide was attached through a flexible ultra-high vacuum Swedge Lock. Note that, with regard to the ethylene oxide, the system was immersed in an ice bath, and the pressure inside the burette was maintained at a negative pressure.

The pressure inside the reaction apparatus was reduced, and the operation of substituting the inside of the system with argon gas was repeated 6 times. Further, to make sure that there was no leak in the reaction system, the pressure inside the vessel was measured. Thereafter, cyclohexane was added as a reaction solvent and further, a sec-butyl lithium solution (a mixture solution of 3.28 mL of 1.29 M (molar concentration) sec-butyl lithium and $4.93 \times 10^{-3}$ mol of cyclohexane) was added as an initiator from the septum stopper by using a syringe. Note that, the sec-butyl lithium solution was placed in a dry box until use. Styrene was gradually added to the mixture solution of this initiator and cyclohexane. When this reaction mixture liquid was heated to 43° C. using a water bath, the color of the reaction mixture liquid turned orange-red. While applying pressure, the temperature was raised to 53° C. in 10 minutes from the initiation of the reaction, then the temperature was lowered to 42° C., and the reaction mixed liquid was allowed to react while stirring for 4.3 hours. Thereafter, before adding ethylene oxide which is a reaction stopping agent, the temperature was lowered to room temperature. When ethylene oxide was added, the color of the reaction mixed liquid immediately turned colorless. This mixture liquid was stirred at room temperature for 14 hours, and then was taken out from the reaction vessel under an atmosphere consisting of argon at a positive pressure. This product was poured into a 50:50 (volume ratio) mixed liquid of 2-propanol and methanol at room temperature, the white precipitate thus obtained was subjected to suction filtration, followed by drying at 112° C. under vacuum for 15 hours, to obtain PSOH. The weight average molecular weight of the PSOH thus produced was 19,500, and the molecular weight distribution was 1.02.

1-2. Synthesis of Polystyrene-Polylactic Acid Copolymer (PS-b-PLLA)

All the lactide polymerization reactions were carried out in a closed dry box, and dry toluene including lactide with an initial concentration of 1.0 M was used. Equal molar amounts of triethyl aluminum ($Et_3Al$) and PSOH were reacted to form an aluminum alkoxide initiator. The diblock copolymer synthesized by using these compounds was re-precipitated in methanol, and then filtered off by suction filtration. The obtained block copolymer was dried at 120° C. under vacuum. The weight average molecular weight of the poly-L-lactic acid (PLLA)/polystyrene (PS) diblock copolymer thus obtained was 40,500, and the molecular weight distribution was 1.1.

Synthesis Example 2

Synthesis of Poly-D-Lactic Acid (PDLA) Homopolymer

D-lactic acid monomers were dissolved in ethyl acetate anhydride, and then purified by re-precipitation. Polymerization was conducted at 130° C. in an ampoule, which was made of glass and equipped with a stirring bar coated with Teflon (registered trademark). Tin(I) octanoate was added as a catalyst to petroleum ether to carry out ring-opening polymerization. In this process, the pressure inside the ampoule tube was reduced using a high vacuum pump, and the inside of the system was repeatingly substituted by high purity nitrogen gas to remove volatile impurities, the solvent, and dissolved oxygen. Thereafter, the ampoule tube was sealed using a burner, and the temperature was raised to the reaction temperature. After the reaction was completed, the reaction product was taken out from the ampoule tube and was dissolved in chloroform, and then the resulting solution was added to an excess amount of methanol to obtain precipitates, followed by filtration and drying, thereby obtaining a product. The weight average molecular weight of the obtained PDLA was 19,500, and the molecular weight distribution was 1.1.

1 g of the poly-L-lactic acid (PLLA)/polystyrene (PS) diblock copolymer (weight average molecular weight: 40,500, molecular weight distribution 1.1), which was formed from a PLLA polymer having a molecular weight of 19,500 and polystyrene having a molecular weight of 21,000 and was obtained by Synthesis Example 1, and 0.5 g of the poly-D-lactic acid (PDLA) homopolymer (weight average molecular weight: 19,500, molecular weight distribution 1.1), which was obtained by Synthesis Example 2, were dissolved in chloroform at room temperature (25° C.) such that the polymer concentration was 1% by mass, to obtain a polymer mixture solution.

The polymer mixture solution thus obtained was casted on petri dishes (diameter: 7 cm×5 dishes) made of Teflon (registered trademark) at room temperature (25° C.), followed by drying to remove the solvent, thereby obtaining a film-shaped polymer mixture. Further, the resultant was dried under reduced pressure for 24 hours, to obtain a film-shaped polymer mixture (a molded body of Example 1) (the condition of the pressure reduction: 1 Pa).

It should be noted that the amount of the PLLA component in the diblock copolymer (PLLA-b-PS) is about 0.5 g, which is almost equal to the amount of the PDLA homopolymer to be added. Namely, the amount of the polylactic acid component (PLLA+PDLA) is about 1 g, with respect to 1.5 g of the total polymer amount in the polymer mixture solution; and PLLA:PDLA is about 1:1. Precisely, the amount of the polylactic acid component is [1 g×19,500/40,500+0.5 g], and PLLA:PDLA is 0.98:1.

When a cast film having a diameter of 15 cm was prepared using this polymer mixture solution, cracks were observed at a part of the film, and it was revealed that the uniformity was slightly inferior.

WAXD measurement of the obtained film was conducted, and it was revealed that the crystals incorporated in the film were all SC crystals.

As the WAXD apparatus, ULTIMA III (trade name) manufactured by Rigaku Corporation (X-ray generating voltage: 40 kV, electric current: 40 mA, Cu target, Ni filter) was used, and measurement was performed within the measurement range of an angle of diffraction 2θ of from 5° to 30°, at intervals of 0.02°. Note that, q=4 π sin θ/λ (λ represents the wavelength of Cu—Kα line: 1.54 Å).

The DSC chart obtained when the measurement of melting point was carried out in Example 1 and Example 2 described below is shown in FIG. 1. In the measurement of DSC, as shown in FIG. 1, two endothermic peaks were observed at 225° C. and 241° C., and the heat of fusion was 42 J/g.

The DSC apparatus used for the measurement of melting point was PYRIS 1 DSC (trade name), manufactured by PerkinElmer, Inc., and the temperature elevation rate was 10° C./min. In this specification, the melting peak temperature in the DSC chart recorded by the above measurement is defined as the melting point (Tm) of the sample. It should be noted that, in a case in which two endothermic peaks are observed as in Example 1, the sample exhibits fluidity and cannot be suitably utilized as a member at a temperature equal to or higher than the higher endothermic peak temperature (melting point Tm) of the two, and therefore, this value of melting point is an index of limit temperature of heat resistance. In a case in which plural melting peaks appear as in Example 1, the sample does not exhibit fluidity and is in the solid state at the temperature equal to or lower than the highest melting peak temperature, and therefore, the temperature of the melting peak that is positioned at the highest temperature is defined as the melting point (Tm) of the sample. Further, the heat of fusion (ΔHf) is calculated from the area of the melting peak, and using this value, the SC crystal fraction and the α crystal fraction are calculated.

Further, when measured by the means described in the Method 1 described above, it was confirmed that the film of Example 1 was a film containing 35% by mass of polystyrene derived from the block copolymer.

The SC crystal fraction (Xsc) with respect to the amount of the polylactic acid component (PLLA+PDLA: however, the polystyrene component is excluded) is [{42 J/g×(1.5/0.98)}/(155 J/g)]×100=41(%).

The SC crystal fraction with respect to the total amount of the polymer compounds is [(42 J/g)/(155 J/g)]×100=27(%).

Here, the measurement and calculation of the content of the crystal component are carried out with reference to the following values described in the literature (J. Polym. Sci., Polym. Phys. Ed., Vol. 45, p. 2632 (2007)).

Figure 2:
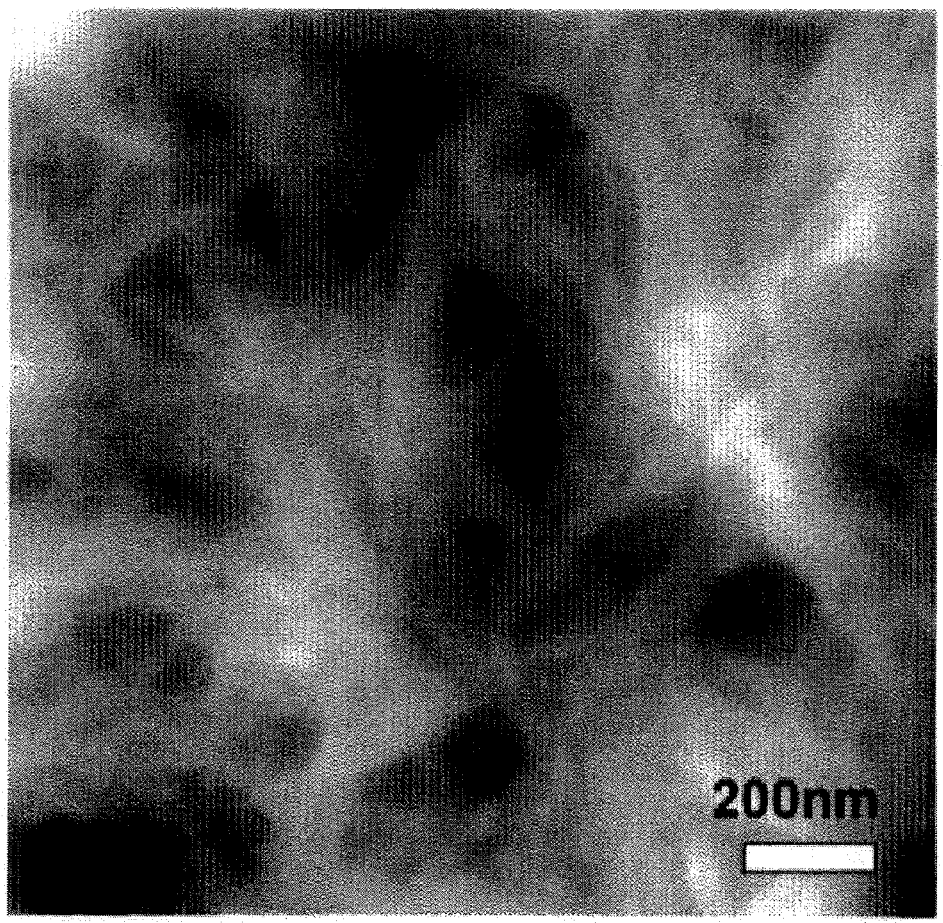
FIG. 2 is a scanning probe microscope image showing a porous body structure of a membrane formed from a polymer mixture which contains the polylactic acid obtained in Example 1.

The heat of fusion of a 100% α crystal of a PLLA homopolymer or a PDLA homopolymer is 94 J/g The heat of fusion of a 100% SC crystal of a blend of PLLA and PDLA (PLLA:PDLA=1:1) is 155 J/g The structure of this film-shaped molded body was observed using a scanning probe microscope, E-SWEEP (trade name) manufactured by SII NanoTechnology Inc., in non-contact mode. FIG. 2 is a scanning probe microscope image showing the structure of the film-shaped porous body formed from the polymer mixture containing the polylactic acid obtained in Example 1. As shown in FIG. 2, it is confirmed that this film-shaped molded body forms a porous body including a great number of holes having a pore diameter of from 10 nm to 100 nm, the holes having been made by removing the solvent contained in polystyrene, which is the component other than polylactic acid, in the solvent removing process.

Example 2

Preparation of films was conducted in a manner substantially similar to that in Example 1, except that the addition amount of the poly-D-lactic acid (PDLA) was changed to 0.25 g, and 4 petri dishes having a diameter of 7 cm were used. In this case, the amount of the polylactic acid component (PLLA+PDLA) is about 0.75 g, with respect to 1.25 g of the total polymer amount in the polymer mixture solution; and PLLA:PDLA is about 2:1. Precisely, the amount of the poly-lactic acid component is [1 g×19,500/40,500+0.25 g], and PLLA:PDLA is 1.93:1.

WAXD measurement of the obtained film was conducted, and it was revealed that the crystals incorporated in the film were all SC crystals. DSC measurement was conducted, and it was revealed that the melting point (Tm) was 244° C., and the heat of fusion was 45 J/g.

Further, the SC crystal fraction (Xsc) with respect to the amount of the polylactic acid component (PLLA+PDLA: however, the polystyrene component is excluded) determined by the DSC measurement is [45 J/g×(1.25/0.73)}/(155 J/g)×100=50(%).

The SC crystal fraction with respect to the total amount of the polymer compounds is [(45 J/g)/(155 J/g)]×100=29(%).

Further, when measured in a manner substantially similar to that in Example 1, it was confirmed that the film of Example 2 was a film containing 42% by mass of polystyrene derived from the block copolymer.

Example 3

A poly-D-lactic acid (PDLA)/polystyrene (PS) diblock copolymer (weight average molecular weight: 38,000, molecular weight distribution 1.1) formed from PDLA having a molecular weight of 17,000 and polystyrene having a molecular weight of 21,000 was synthesized using D-lactic acid in place of L-lactic acid in Synthesis Example 1. Further, poly-L-lactic acid having a weight average molecular weight of 17,000 and a molecular weight distribution of 1.1 was synthesized using L-lactic acid in place of D-lactic acid in Synthesis Example 2.1 g of this poly-D-lactic acid (PDLA)/polystyrene (PS) diblock copolymer (PDLA-b-PS) and 0.5 g of the poly-L-lactic acid (PLLA) were dissolved in chloroform at room temperature (25° C.) such that the polymer concentration was 1% by mass, to obtain a polymer mixture solution.

The polymer mixture solution thus obtained was casted on petri dishes (diameter: 7 cm×5 dishes) made of Teflon (registered trademark) at room temperature (25° C.), followed by drying, to obtain film-shaped samples. Further, the resulting samples were dried under reduced pressure for 24 hours.

When a cast film having a diameter of 15 cm was prepared using the obtained polymer mixture solution, cracks were observed at a part of the film, and it was revealed that the uniformity was slightly inferior.

In this case, the amount of the polylactic acid component is [1 g×17,000/38,000+0.5 g], and PDLA:PLLA is 0.89:1.

WAXD measurement of the obtained film was conducted, and it was revealed that the crystals incorporated in the film were all SC crystals. DSC measurement was conducted, and it was revealed that the melting point (Tm) was 241° C., and the heat of fusion was 42 J/g.

Accordingly, the SC crystal fraction (Xsc) with respect to the amount of the polylactic acid component (PLLA+PDLA: however, the polystyrene component is excluded) is [{42 J/g×(1.5/0.95)}/(155 J/g)]×100=43(%).

The SC crystal fraction with respect to the total amount of the polymer compounds is [(42 J/g)/(155 J/g)]×100=27(%).

Further, when measured in a manner substantially similar to that in Example 1, it was confirmed that the film of Example 3 was a film containing 37% by mass of polystyrene derived from the block copolymer.

The melting point and heat of fusion of each crystal obtained in Example 1 to Example 3 are shown in the following Table 1.

TABLE 1

|  | Tm (° C.) | Melting Peak (° C.) | ΔHf | Xsc (%) |
| --- | --- | --- | --- | --- |
| Example 1 | 241 | 226, 241 | 42 | 41 |
| Example 2 | 244 | 228, 244 | 45 | 50 |
| Example 3 | 241 | 226, 241 | 42 | 43 |

Example 1A

A film was prepared in a manner substantially similar to that in Example 1, and this film was placed in an aluminum pan, followed by elevating the temperature, in an DSC oven, at a temperature elevation rate of 10° C./min to a preset temperature in a range of from 205° C. to 230° C., then the film was maintained at the preset temperature for 30 minutes to perform heat treatment, and thereafter, the temperature was lowered to room temperature at a rate of 100° C./min. DSC measurement of this sample was conducted at a temperature elevation rate of 10° C./min.

WAXD measurement was conducted in a manner substantially similar to that in Example 1, and it was revealed that the crystals obtained were all SC crystals, and the melting point (Tm) and the heat of fusion were as described below.

Since the heat treatment temperature was changed in Example 1A, the one that has been heat-treated at 205° C. is expressed as Example 1A-1, the one that has been heat-treated at 210° C. is expressed as Example 1A-2, the one that has been heat-treated at 215° C. is expressed as Example 1A-3, the one that has been heat-treated at 220° C. is expressed as Example 1A-4, the one that has been heat-treated at 225° C. is expressed as Example 1A-5, and the one that has been subjected to heat treatment at 230° C. is expressed as Example 1A-6. The heat treatment time was 30 minutes in all cases.

(1A-1)

Heat treatment at 205° C.: Tm=244° C., heat of fusion 43 J/g (the SC crystal fraction (Xsc) with respect to the amount of the PLA component is 42%)

(1A-2)

Heat treatment at 210° C.: Tm=244° C., heat of fusion 46 J/g (the SC crystal fraction (Xsc) with respect to the amount of the PLA component is 45%)

(1A-3)

Heat treatment at 215° C.: Tm=243° C., heat of fusion 45 J/g (the SC crystal fraction (Xsc) with respect to the amount of the PLA component is 44%)

(1A-4)

Heat treatment at 220° C.: Tm=244° C., heat of fusion 42 J/g (the SC crystal fraction (Xsc) with respect to the amount of the PLA component is 41%)

(1A-5)

Heat treatment at 225° C.: Tm=245° C., heat of fusion 49 J/g (the SC crystal fraction (Xsc) with respect to the amount of the PLA component is 48%)

(1A-6)

Heat treatment at 230° C.: Tm=245° C., heat of fusion 44 J/g (the SC crystal fraction (Xsc) with respect to the amount of the PLA component is 43%)

Figure 3:
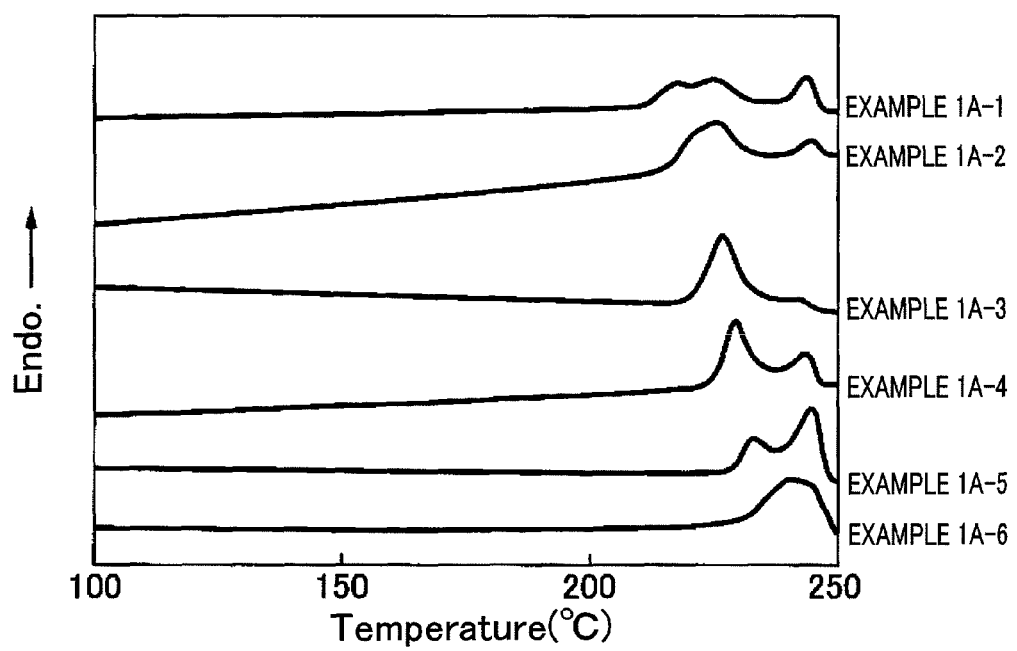
FIG. 3 is a graph showing the results of DSC measurement used for the measurement of melting points of the polylactic acids obtained in Example 1A.

The DSC chart obtained when the measurement of melting point was carried out in Example 1A is shown in FIG. 3. Further, the melting point and heat of fusion of each crystal obtained in Example 1A are shown in the following Table 2.

TABLE 2

| | Tm (° C.) | Melting Peak (° C.) | ΔHf | Xsc (%) |
|---|---|---|---|---|
| Example 1A-1 | 244 | 225, 244 | 43 | 42 |
| Example 1A-2 | 244 | 226, 244 | 46 | 45 |
| Example 1A-3 | 243 | 227, 243 | 45 | 44 |
| Example 1A-4 | 244 | 229, 244 | 42 | 41 |
| Example 1A-5 | 245 | 233, 245 | 49 | 48 |
| Example 1A-6 | 245 | 241, 245 | 44 | 43 |

Example 1B

A film was prepared in a manner substantially similar to that in Example 1, and this film was placed in an aluminum pan, followed by elevating the temperature, in an DSC oven, at a temperature elevation rate of 100° C./min to the preset temperature of 230° C., then the film was maintained at the preset temperature for 5 minutes to 6 hours to perform heat treatment, and thereafter, the temperature was lowered to room temperature at a rate of 100° C./min. DSC measurement of this sample was conducted at a temperature elevation rate of 10° C./min.

Since the heat treatment time was changed in Example 1B, the one that has been heat-treated for 5 minutes is expressed as Example 1B-1, the one that has been heat-treated for 30 minutes is expressed as Example 1B-2, and the one that has been heat-treated for 6 hours is expressed as Example 1B-3. The heat treatment temperature was 230° C. in all cases.

WAXD measurement was conducted in a manner substantially similar to that in Example 1, and it was revealed that the crystals obtained were all SC crystals, and the melting point (Tm) and the heat of fusion were as described below.

(1B-1)

Heat treatment for 5 minutes: Tm=240° C., heat of fusion 52 J/g (the SC crystal fraction (Xsc) with respect to the amount of the PLA component is 51%)

(1B-2)

Heat treatment for 30 minutes: Tm=245° C., heat of fusion 49 J/g (the SC crystal fraction (Xsc) with respect to the amount of the PLA component is 48%)

(1B-3)

Heat treatment for 6 hours: Tm=245° C., heat of fusion 33 J/g (the SC crystal fraction (Xsc) with respect to the amount of the PLA component is 32%)

Figure 4:
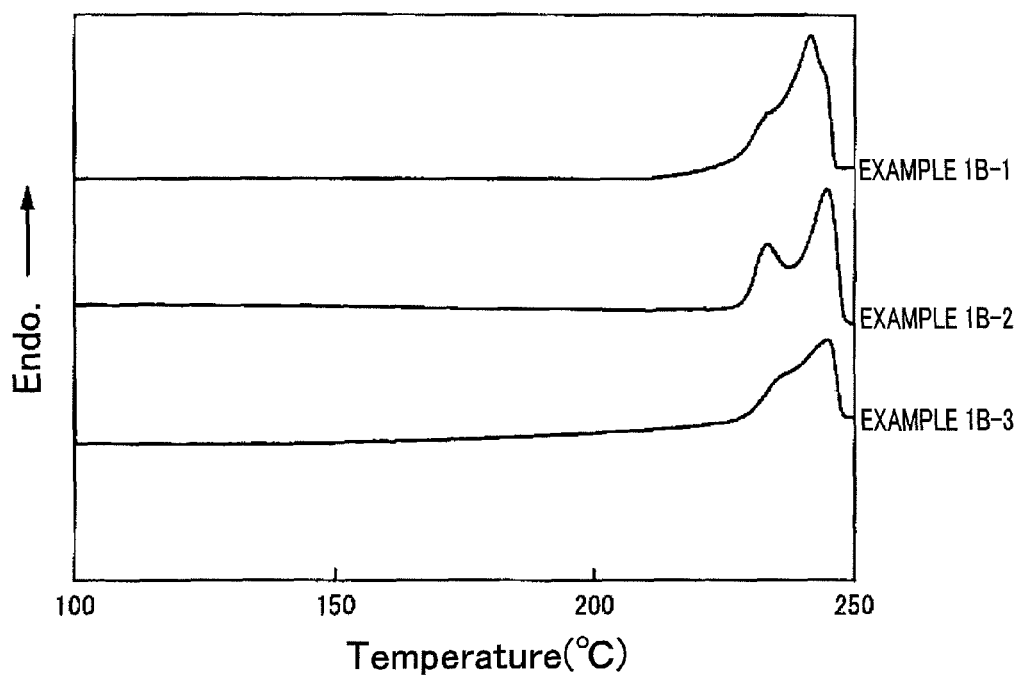
FIG. 4 is a graph showing the results of DSC measurement used for the measurement of melting points of the polylactic acids obtained in Example 1B.

The DSC chart obtained when the measurement of melting point was carried out in Example 1B is shown in FIG. 4. Further, the melting point and heat of fusion of each crystal obtained in Example 1B are shown in the following Table 3.

TABLE 3

| | Tm (° C.) | ΔHf | Xsc (%) |
|---|---|---|---|
| Example 1B-1 | 240 | 52 | 51 |
| Example 1B-2 | 245 | 49 | 48 |
| Example 1B-3 | 245 | 33 | 32 |

Example 4

1.04 g of a commercially available PLLA-b-PS (trade name: P2642-SLA, manufactured by Polymer Source, Inc.; PLLA molecular weight 19,500, PS molecular weight 21,000, total 40,500, molecular weight distribution 1.11) and 0.5 g of a commercially available PDLA (trade name: P8937-LA, manufactured by Polymer Source, Inc.; molecular weight 19,500, molecular weight distribution 1.3) were dissolved in chloroform at room temperature (25° C.) such that the polymer concentration was 1% by mass, to obtain a polymer mixture solution.

The polymer mixture solution thus obtained was casted on petri dishes (diameter: 7 cm×5 dishes) made of Teflon (registered trademark) at room temperature (25° C.), followed by drying to remove the solvent, thereby obtaining a film-shaped polymer mixture. Further, the resultant was dried under reduced pressure for 24 hours, to obtain a film-shaped polymer mixture (a molded body of Example 4) (the condition of the pressure reduction: 1 Pa).

It should be noted that the amount of the PLLA component in the diblock copolymer is 0.5 g, which is equal to the amount of the PDLA homopolymer to be added. Namely, the amount of the polylactic acid component (PLLA+PDLA) is 1 g, with respect to 1.54 g of the total polymer amount in the polymer mixture solution; and PLLA:PDLA is 1:1.

When a cast film having a diameter of 15 cm was prepared using the obtained polymer mixture solution, cracks were observed at a part of the film, and it was revealed that the uniformity was slightly inferior.

Figure 5:
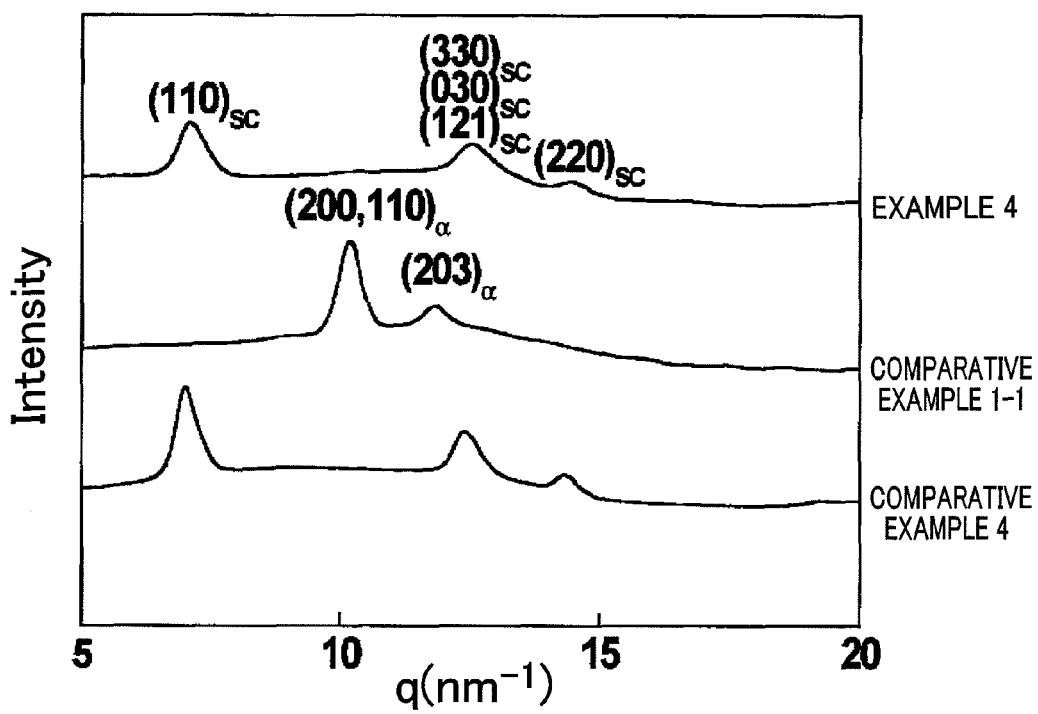
FIG. 5 is a graph showing the results of WAXD measurement of the films obtained in Example 4, Comparative Example 1-1, and Comparative Example 4; in the graph, the vertical axis shows the diffraction intensity (in an arbitrary unit) and the horizontal axis shows the scattering vector (q).

WAXD measurement of the obtained film was conducted, and it was revealed that the crystals contained were all SC crystals. The results of the WAXD measurement of the film obtained in Example 4 are shown in FIG. 5. It should be noted that the vertical axis shows the diffraction intensity (in an arbitrary unit) and the horizontal axis shows the scattering vector (q). This figure involves the results of Comparative Example 1-1 and Comparative Example 4, which are described below.

As the WAXD apparatus, ULTIMA III (trade name) manufactured by Rigaku Corporation (X-ray generating voltage: 40 kV, electric current: 40 mA, Cu target, Ni filter) was used, and measurement was performed within the measurement range of an angle of diffraction 2θ of from 5° to 30°, at intervals of 0.02°. Note that, $q = 4\pi \sin\theta/\lambda$, (λ represents the wavelength of Cu—Kα line: 1.54 Å).

Figure 6:
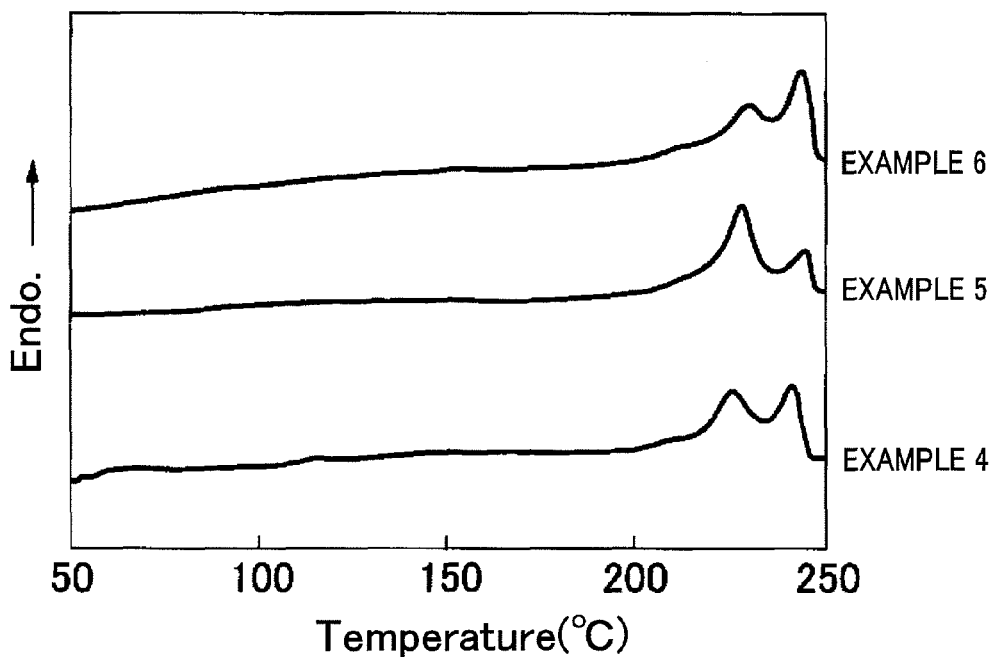
FIG. 6 is a graph showing the results of DSC measurement of the films obtained in Example 4, Example 5, and Example 6.

The DSC chart obtained when the measurement of melting point was carried out in Example 4, as well as Example 5 and Example 6, which are described below, is shown in FIG. 6. In the measurement of DSC, as shown in FIG. 6, two endothermic peaks were observed at 225° C. and 244° C., and the heat of fusion was 43 J/g.

The SC crystal fraction (Xsc) with respect to the amount of the polylactic acid component (PLLA+PDLA: however, the polystyrene component is excluded) is [{43 J/g×(1.54/1)}/(155 J/g)]×100=43(%).

The SC crystal fraction with respect to the total amount of the polymer compounds is [(43 J/g)/(155 J/g)]×100=28(%).

Further, when measured in a manner substantially similar to that in Example 1, it was confirmed that the film of Example 4 was a film containing 35% by mass of polystyrene derived from the block copolymer.

Example 5

Preparation of a film was conducted in a manner substantially similar to that in Example 4, except that the addition amount of the PLLA-b-PS was changed to 1 g, and the addition amount of the poly-D-lactic acid (PDLA) was changed to 0.32 g. In this case, the amount of the polylactic acid component (PLLA+PDLA), with respect to 1.32 g of the total polymer amount in the polymer mixture solution, is [1 g×19,500/40,500+0.32 g]; and PLLA:PDLA is 1.50:1.

WAXD measurement of the obtained film was conducted, and it was revealed that the crystals incorporated in the film were all SC crystals. DSC measurement was conducted, and it was revealed that the melting point (Tm) was 245° C., and the heat of fusion was 45 J/g (FIG. 6).

Further, the SC crystal fraction (Xsc) with respect to the amount of the polylactic acid component (PLLA+PDLA: however, the polystyrene component is excluded) determined by the DSC measurement is [45 J/g×(1.32/0.80)}/(155 J/g]×100=48(%).

The SC crystal fraction with respect to the total amount of the polymer compounds is [(45 J/g)/(155 J/g)]×100=29(%).

When measured in a manner substantially similar to that in Example 1, it was confirmed that the film of Example 5 was a film containing 39% by mass of polystyrene derived from the block copolymer.

Example 6

Preparation of a film was conducted in a manner substantially similar to that in Example 4, except that the addition amount of the PLLA-b-PS was changed to 1 g, and the addition amount of the poly-D-lactic acid (PDLA) was changed to 0.16 g. In this case, the amount of the polylactic acid component (PLLA+PDLA), with respect to 1.16 g of the total polymer amount in the polymer mixture solution, is [1 g×19,500/40,500+0.16 g]; and PLLA:PDLA is 3.00:1.

WAXD measurement of the obtained film was conducted, and it was revealed that the crystals incorporated in the film were all SC crystals. DSC measurement was conducted, and it was revealed that the melting point (Tm) was 244° C., and the heat of fusion was 44 J/g (FIG. 6).

Further, the SC crystal fraction (Xsc) with respect to the amount of the polylactic acid component (PLLA+PDLA: however, the polystyrene component is excluded) determined by the DSC measurement is [44 J/g×(1.16/0.64)}/(155 J/g]×100=51(%).

The SC crystal fraction with respect to the total amount of the polymer compounds is [(44 J/g)/(155 J/g)]×100=28(%).

When measured in a manner substantially similar to that in Example 1, it was confirmed that the film of Example 6 was a film containing 45% by mass of polystyrene derived from the block copolymer.

The melting point and heat of fusion of each crystal obtained in Example 4 to Example 6 are shown in the following Table 4.

TABLE 4

|  | Tm (° C.) | Melting Peak (° C.) | ΔHf (J/g) | Xsc (%) |
| --- | --- | --- | --- | --- |
| Example 4 | 225, 244 | 244 | 43 | 43 |
| Example 5 | 226, 245 | 245 | 45 | 48 |
| Example 6 | 227, 244 | 244 | 44 | 51 |

Example 7

A film was prepared in a manner substantially similar to that in Example 4, and this film was placed in an aluminum pan, followed by elevating the temperature, in an DSC oven, at a temperature elevation rate of 10° C./min to a preset temperature in a range of from 205° C. to 230° C., then the film was maintained at the preset temperature for 30 minutes to perform heat treatment, and thereafter, the temperature was lowered to room temperature at a rate of 100° C./min. DSC measurement of this sample was conducted at a temperature elevation rate of 10° C./min.

WAXD measurement was conducted in a manner substantially similar to that in Example 1, and it was revealed that the crystals obtained were all SC crystals, and the melting point (Tm) and the heat of fusion were as described below.

Since the heat treatment temperature was changed from that in Example 4, the one that has been heat-treated at 205° C. is expressed as Example 7-1, the one that has been heat-treated at 210° C. is expressed as Example 7-2, the one that has been heat-treated at 215° C. is expressed as Example 7-3, the one that has been heat-treated at 220° C. is expressed as Example 7-4, the one that has been heat-treated at 225° C. is expressed as Example 7-5, and the one that has been subjected to isothermal crystallization at 230° C. is expressed as Example 7-6. The heat treatment time was 30 minutes in all cases.

(7-1)

Heat treatment at 205° C.: Tm=244° C., heat of fusion 43 J/g (the SC crystal fraction (Xsc) with respect to the amount of the PLA component is 43%)

(7-2)

Heat treatment at 210° C.: Tm=244° C., heat of fusion 46 J/g (the SC crystal fraction (Xsc) with respect to the amount of the PLA component is 46%)

(7-3)

Heat treatment at 215° C.: Tm=243° C., heat of fusion 45 J/g (the SC crystal fraction (Xsc) with respect to the amount of the PLA component is 45%)

(7-4)

Heat treatment at 220° C.: Tm=244° C., heat of fusion 42 J/g (the SC crystal fraction (Xsc) with respect to the amount of the PLA component is 42%)

(7-5)

Heat treatment at 225° C.: Tm=245° C., heat of fusion 49 J/g (the SC crystal fraction (Xsc) with respect to the amount of the PLA component is 49%)

(7-6)

Heat treatment at 230° C.: Tm=245° C., heat of fusion 44 J/g (the SC crystal fraction (Xsc) with respect to the amount of the PLA component is 44%)

Figure 7:
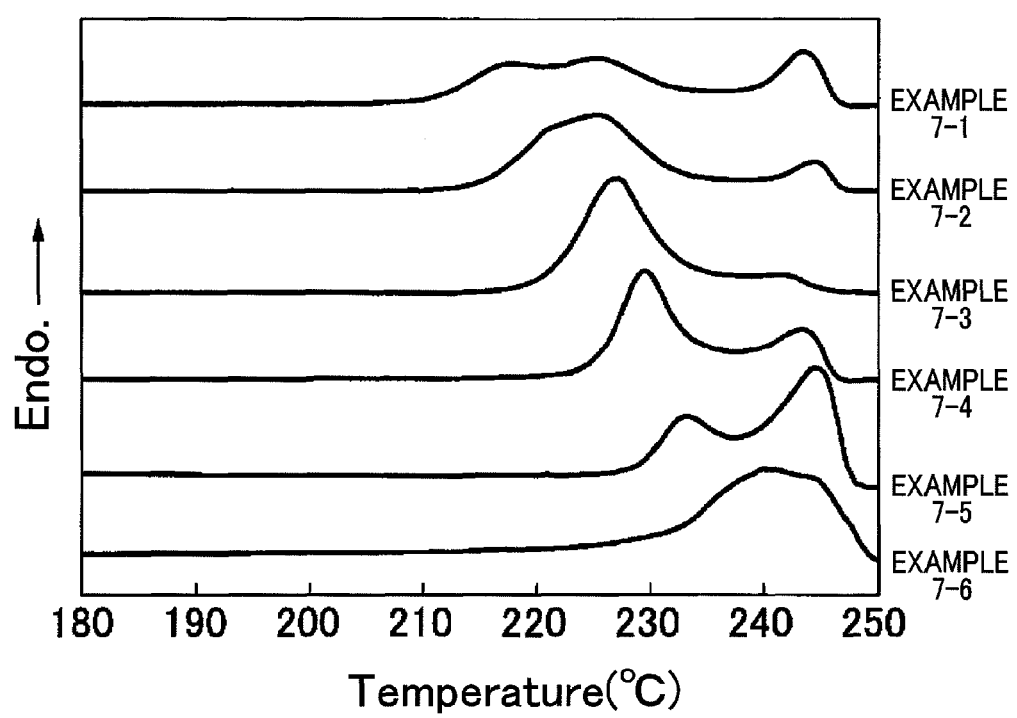
FIG. 7 is a graph showing the results of DSC measurement of the films obtained in Example 7.

The DSC chart obtained when the measurement of melting point was carried out in Example 7 is shown in FIG. 7. Further, the melting point and heat of fusion of each crystal obtained in Example 7 are shown in the following Table 5.

TABLE 5

|  | Tm (° C.) | Melting Peak (° C.) | ΔHf (J/g) | Xsc (%) |
| --- | --- | --- | --- | --- |
| Example 7-1 | 244 | 225, 244 | 43 | 43 |
| Example 7-2 | 244 | 226, 244 | 46 | 46 |
| Example 7-3 | 243 | 227, 243 | 45 | 45 |
| Example 7-4 | 244 | 229, 244 | 42 | 42 |
| Example 7-5 | 245 | 233, 245 | 49 | 49 |
| Example 7-6 | 245 | 241, 245 | 44 | 44 |

Example 8

Preparation of a film was conducted in a manner substantially similar to that in Example 4, except that as the poly-L-lactic acid (PLLA)/polystyrene (PS) diblock copolymer, 1 g of a commercially available PLLA-b-PS (trade name: P2643-SLA, manufactured by Polymer Source, Inc.; PS molecular weight 21,000, weight average molecular weight 35,000, molecular weight distribution 1.1) in which the molecular weight of PLLA is 14,000 was used and, as the poly-D-lactic acid (PDLA), 0.4 g of a commercially available PDLA (trade name: P3923-LA, manufactured by Polymer Source, Inc.; molecular weight distribution 1.2) having a molecular weight of 16,500 was used.

In this case, the amount of the polylactic acid component is [1 g×14,000/35,000+0.4 g]; and PLLA:PDLA is 1:1.

Figure 8:
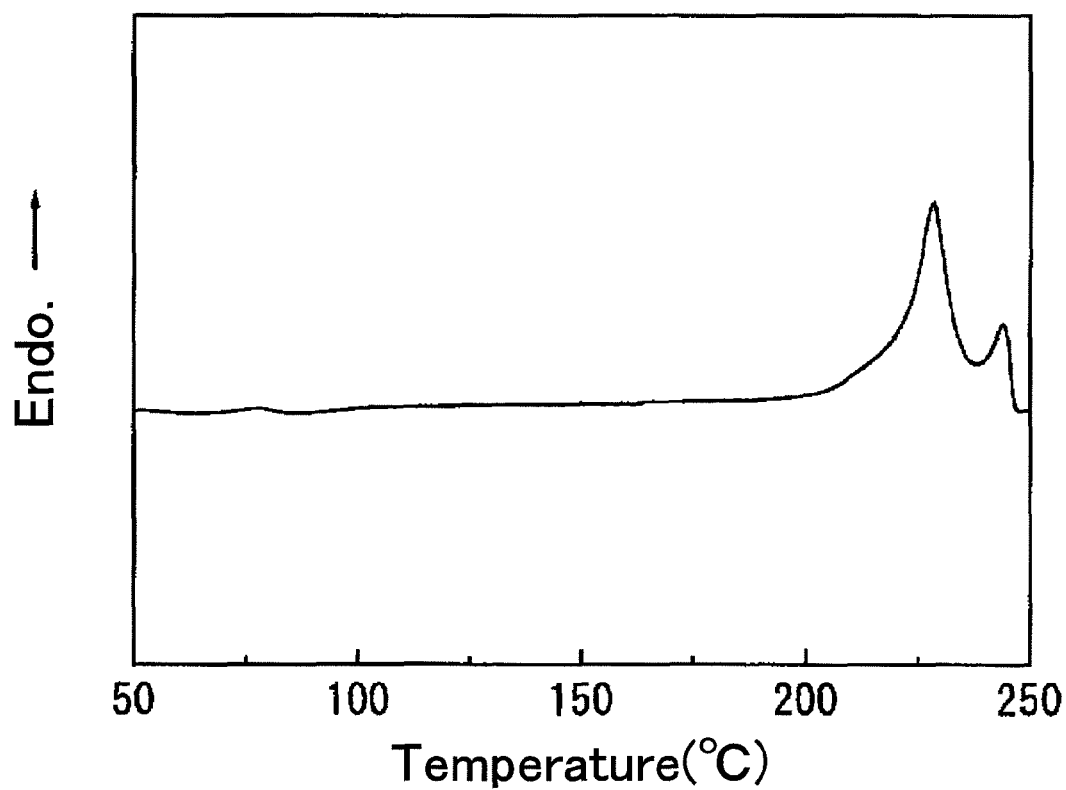
FIG. 8 is a graph showing the results of DSC measurement of the film obtained in Example 8

WAXD measurement of the obtained film was conducted, and it was revealed that the crystals incorporated in the film were all SC crystals. DSC measurement was conducted, and it was revealed that the melting point (Tm) was 245° C., and the heat of fusion was 60 J/g. The results of the DSC measurement of the film obtained in Example 8 are shown in FIG. 8.

Accordingly, the SC crystal fraction (Xsc) with respect to the amount of the polylactic acid component (PLLA+PDLA: however, the polystyrene component is excluded) is [{60 J/g×(1.4/0.8)}/(155 J/g)]×100=68(%).

The SC crystal fraction with respect to the total amount of the polymer compounds is [(60 J/g)/(155 J/g)]×100=39(%).

When measured in a manner substantially similar to that in Example 1, it was confirmed that the film of Example 8 was a film containing 43% by mass of polystyrene derived from the block copolymer.

Figure 9:
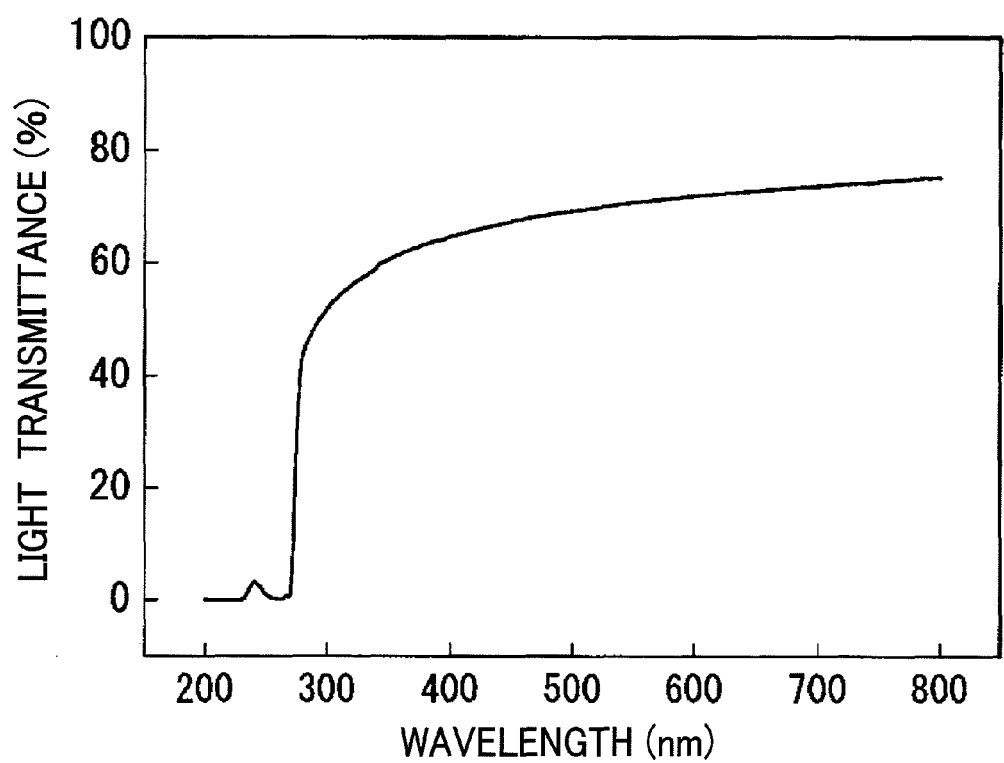
FIG. 9 is a graph showing the results of light transmittance measurement of the film obtained in Example 8.

When scanning probe microscope measurement of the film of Example 8 was conducted, a smooth surface structure was observed. Therefore, with regard to the film of Example 8, the film having a thickness of 80 µm, the light transmittance of the film was measured using an ultraviolet-visible light absorptiometer, model: U-3010, manufactured by Hitachi, Ltd., and as a result, a transmission factor of 71% was obtained at a wavelength of 560 nm. The results of the ultraviolet-visible light absorbance measurement of the film obtained in Example 8 are shown in FIG. 9. It can be said that, since the size of the micro-phase separated structure formed by the block copolymer is several tens nm and is smaller than the wavelength (several hundreds nm) of visible light, light is not scattered, and thus, a transparent film adequate for practical use is obtained.

Example 9

1.04 g of a commercially available PLLA-b-PS (trade name: P2642-SLA, manufactured by Polymer Source, Inc.; PLLA molecular weight 19,500, PS molecular weight 21,000, total 40,500, molecular weight distribution 1.11) and 0.5 g of poly-D-lactic acid manufactured by PURAC (PDLA; molecular weight 230,000) were dissolved in chloroform at room temperature (25° C.) such that the polymer concentration was 1% by mass, to obtain a polymer mixture solution.

The polymer mixture solution thus obtained was casted on a petri dish (diameter: 15 cm×1 dish) made of Teflon (registered trademark) at room temperature (25° C.), followed by drying, to obtain a film-shaped sample having a relatively large area with a diameter of 15 cm. Further, the resulting sample was dried under reduced pressure for 24 hours. As a result, a uniform film was obtained.

In this case, the ratio of polylactic acid component (PLLA:PDLA ratio) is 1:1.

Figure 10:
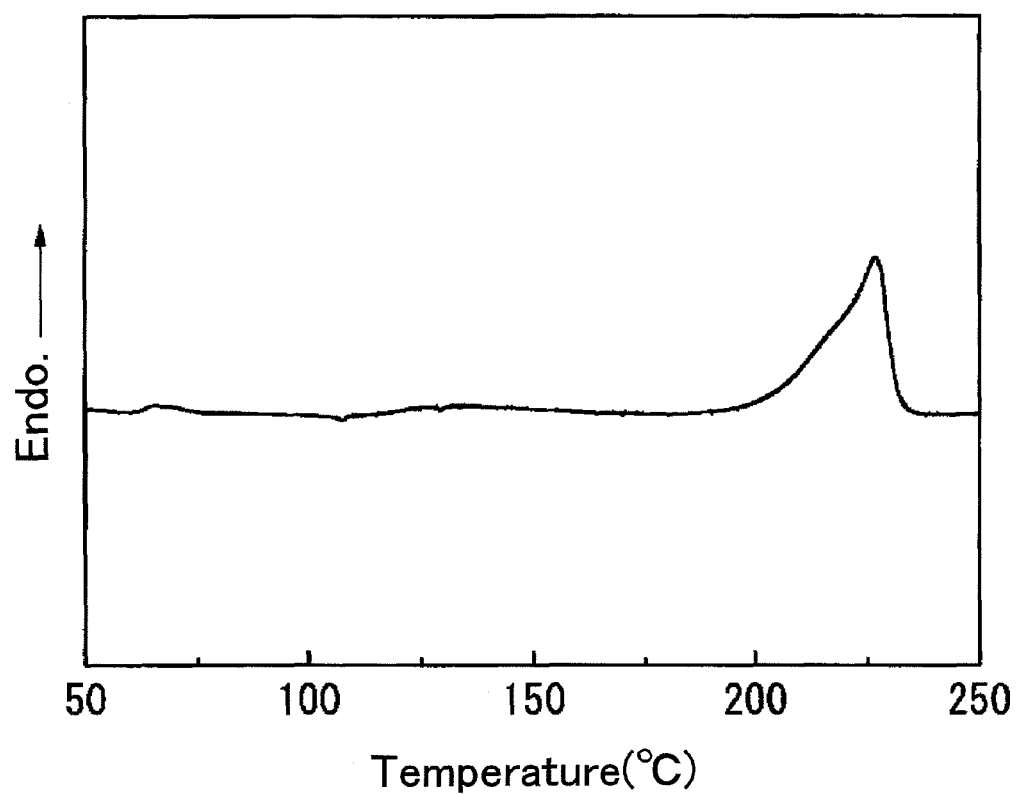
FIG. 10 is a graph showing the results of DSC measurement of the film obtained in Example 9.

WAXD measurement of the obtained film was conducted, and it was revealed that the crystals incorporated in the film were all SC crystals. DSC measurement of this film was conducted, and it was revealed that the melting point (Tm) was 227° C., and the heat of fusion (ΔHf) was 36 J/g. The results of the DSC measurement of the film obtained in Example 9 are shown in FIG. 10.

The SC crystal fraction (Xsc) with respect to the amount of the polylactic acid component (PLLA+PDLA: however, the polystyrene component is excluded) is [{36 J/g×(1.54/1)}/(155 J/g)]×100=36(%).

The SC crystal fraction with respect to the total amount of the polymer compounds is [(36 J/g)/(155 J/g)]×100=23(%).

By comparing Example 4 and Example 9, it is understood that, when a PDLA homopolymer having a high molecular weight is used, the uniformity of the film obtained is improved, and a uniform molded body film having a larger area can be obtained.

When measured in a manner substantially similar to that in Example 1, it was confirmed that the film of Example 9 was a film containing 35% by mass of polystyrene derived from the block copolymer.

Example 10

A film was prepared in a manner substantially similar to that in Example 9, and this film was placed in a vacuum oven (the condition of the pressure reduction: 1 Pa) at room temperature, and the temperature was elevated to a preset temperature in a range of from 150° C. to 225° C., and then the film was maintained at the preset temperature for 30 minutes to perform heat treatment, and thereafter, the resulting film was left to cool to room temperature. DSC measurement of this sample was conducted at a temperature elevation rate of 10° C./min.

WAXD measurement was conducted in a manner substantially similar to that in Example 1, and it was revealed that the crystals obtained were all SC crystals, and the melting point (Tm) and the heat of fusion were as described below.

Since the heat treatment temperature was changed in Example 10, the one that has been heat-treated at 150° C. is expressed as Example 10-1, the one that has been heat-treated at 175° C. is expressed as Example 10-2, the one that has been heat-treated at 200° C. is expressed as Example 10-3, the one that has been heat-treated at 205° C. is expressed as Example 10-4, the one that has been heat-treated at 210° C. is expressed as Example 10-5, the one that has been heat-treated at 215° C. is expressed as Example 10-6, the one that has been heat-treated at 220° C. is expressed as Example 10-7, and the one that has been heat-treated at 225° C. is expressed as Example 10-8. The heat treatment time was 30 minutes in all cases.

(10-1)

Heat treatment at 150° C.: Tm=227° C., heat of fusion 47 J/g (the SC crystal fraction (Xsc) with respect to the amount of the PLA component is 47%)

(10-2)

Heat treatment at 175° C.: Tm=226° C., heat of fusion 46 J/g (the SC crystal fraction (Xsc) with respect to the amount of the PLA component is 46%)

(10-3)

Heat treatment at 200° C.: Tm=226° C., heat of fusion 51 J/g (the SC crystal fraction (Xsc) with respect to the amount of the PLA component is 51%)

(10-4)

Heat treatment at 205° C.: Tm=225° C., heat of fusion 57 J/g (the SC crystal fraction (Xsc) with respect to the amount of the PLA component is 57%)

(10-5)

Heat treatment at 210° C.: Tm=225° C., heat of fusion 56 J/g (the SC crystal fraction (Xsc) with respect to the amount of the PLA component is 56%)

(10-6)

Heat treatment at 215° C.: Tm=227° C., heat of fusion 58 J/g (the SC crystal fraction (Xsc) with respect to the amount of the PLA component is 58%)

(10-7)

Heat treatment at 220° C.: Tm=230° C., heat of fusion 58 J/g (the SC crystal fraction (Xsc) with respect to the amount of the PLA component is 58%)

(10-8)

Heat treatment at 225° C.: Tm=235° C., heat of fusion 58 J/g (the SC crystal fraction (Xsc) with respect to the amount of the PLA component is 58%)

Figure 11:
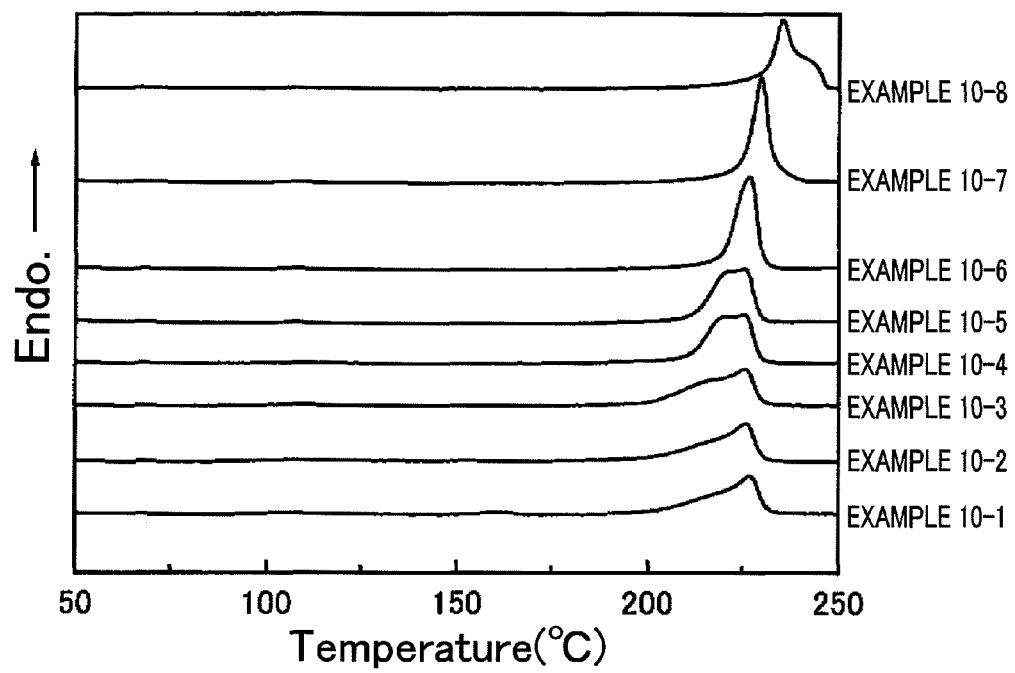
FIG. 11 is a graph showing the results of DSC measurement of the films obtained in Example 10.

The DSC chart obtained when the measurement of melting point was carried out in Example 10 is shown in FIG. 11. Further, the melting point and heat of fusion of each crystal obtained in Example 10 are shown in the following Table 6.

TABLE 6

|  | Tm (° C.) | Melting Peak (° C.) | ΔHf (J/g) | Xsc (%) |
|---|---|---|---|---|
| Example 10-1 | 227 | 227 | 47 | 47 |
| Example 10-2 | 226 | 226 | 46 | 46 |
| Example 10-3 | 226 | 226 | 51 | 51 |
| Example 10-4 | 225 | 221, 225 | 57 | 57 |
| Example 10-5 | 225 | 221, 225 | 56 | 56 |
| Example 10-6 | 227 | 227 | 58 | 58 |
| Example 10-7 | 230 | 230 | 58 | 58 |
| Example 10-8 | 235 | 235 | 58 | 58 |

Example 11

Heat treatment was conducted in a vacuum oven in a manner substantially similar to that in Example 10, except that the heat treatment time was changed to 24 hours, and thereafter, the resulting sample was left to cool to room temperature. DSC measurement of this sample was conducted at a temperature elevation rate of 10° C./min.

WAXD measurement was conducted in a manner substantially similar to that in Example 1, and it was revealed that the crystals obtained were all SC crystals, and the melting point (Tm) and the heat of fusion were as described below.

Since the heat treatment temperature was changed in Example 11, the one that has been heat-treated at 150° C. is expressed as Example 11-1, the one that has been heat-treated at 175° C. is expressed as Example 11-2, the one that has been heat-treated at 200° C. is expressed as Example 11-3, the one that has been heat-treated at 205° C. is expressed as Example 11-4, the one that has been heat-treated at 210° C. is expressed as Example 11-5, the one that has been heat-treated at 215° C. is expressed as Example 11-6, and the one that has been heat-treated at 220° C. is expressed as Example 11-7. The heat treatment time was 24 hours in all cases.

(11-1)

Heat treatment at 150° C.: Tm=227° C., heat of fusion 48 J/g (the SC crystal fraction (Xsc) with respect to the amount of the PLA component is 48%)

(11-2)

Heat treatment at 175° C.: Tm=226° C., heat of fusion 51 J/g (the SC crystal fraction (Xsc) with respect to the amount of the PLA component is 51%)

(11-3)

Heat treatment at 200° C.: Tm=225° C., heat of fusion 62 J/g (the SC crystal fraction (Xsc) with respect to the amount of the PLA component is 62%)

(11-4)

Heat treatment at 205° C.: Tm=224° C., heat of fusion 66 J/g (the SC crystal fraction (Xsc) with respect to the amount of the PLA component is 66%)

(11-5)

Heat treatment at 210° C.: Tm=227° C., heat of fusion 72 J/g (the SC crystal fraction (Xsc) with respect to the amount of the PLA component is 72%)

(11-6)

Heat treatment at 215° C.: Tm=232° C., heat of fusion 73 J/g (the SC crystal fraction (Xsc) with respect to the amount of the PLA component is 73%)

(11-7)

Heat treatment at 220° C.: Tm=234° C., heat of fusion 81 J/g (the SC crystal fraction (Xsc) with respect to the amount of the PLA component is 81%)

Figure 12:
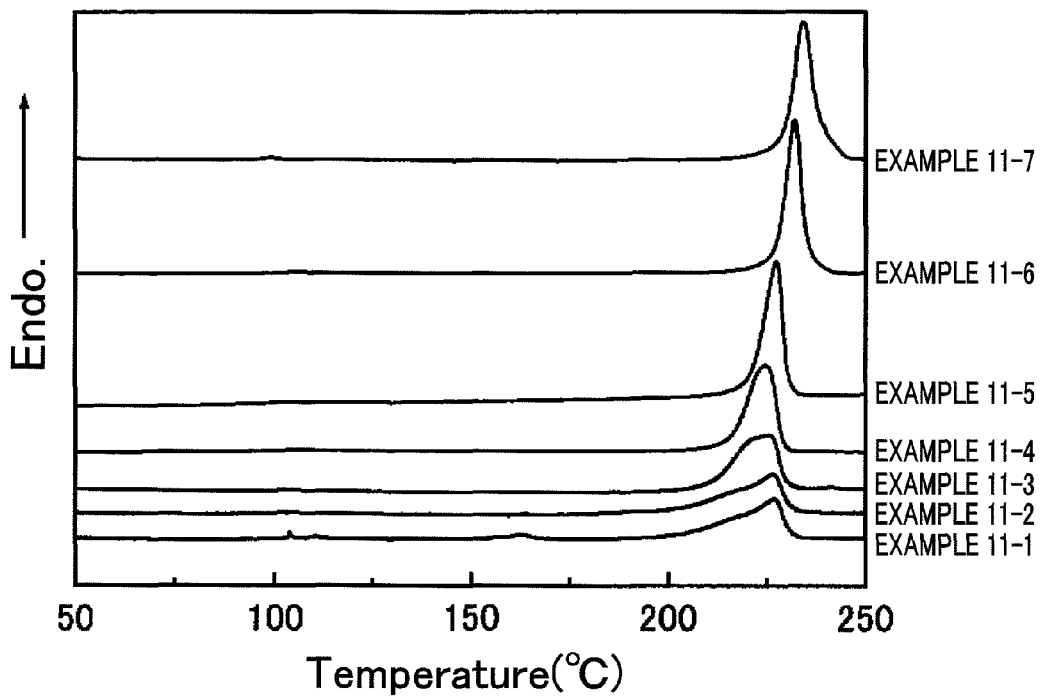
FIG. 12 is a graph showing the results of DSC measurement of the films obtained in Example 11

The DSC chart obtained when the measurement of melting point was carried out in Example 11 is shown in FIG. 12. Further, the melting point and heat of fusion of each crystal obtained in Example 11 are shown in the following Table 7.

TABLE 7

|  | Tm (° C.) | Melting Peak (° C.) | ΔHf (J/g) | Xsc (%) |
|---|---|---|---|---|
| Example 11-1 | 227 | 227 | 48 | 48 |
| Example 11-2 | 226 | 226 | 51 | 51 |
| Example 11-3 | 225 | 225 | 62 | 62 |
| Example 11-4 | 224 | 224 | 66 | 66 |
| Example 11-5 | 227 | 227 | 72 | 72 |
| Example 11-6 | 232 | 232 | 73 | 73 |
| Example 11-7 | 234 | 234 | 81 | 81 |

Comparative Example 1

The poly-L-lactic acid (PLLA)/polystyrene (PS) diblock copolymer (PLLA molecular weight 19,500, PS molecular weight 21,000, molecular weight distribution 1.1) obtained in Synthesis Example 1 was subjected to melt heat treatment at 200° C. for 5 minutes, and then was subjected to isothermal crystallization for 12 hours at a constant temperature between 115° C. to 130° C. (in the above DSC oven). Thereafter, the resulting sample was cooled to room temperature, and DSC measurement was conducted.

Since the crystallization temperature was changed in Comparative Example 1, the one that has been isothermally crystallized at 115° C. is expressed as Comparative Example 1-1, the one that has been isothermally crystallized at 120° C. is expressed as Comparative Example 1-2, the one that has been isothermally crystallized at 125° C. is expressed as Comparative Example 1-3, and the one that has been isothermally crystallized at 130° C. is expressed as Comparative Example 1-4.

WAXD measurement (FIG. 5) of Comparative Example 1-1 was conducted in a manner substantially similar to that in Example 1, and it was revealed that the crystals obtained were all α crystals, and the melting point (Tm) and the heat of fusion were as described below.

Comparative Example 1-1

Crystallization at 115° C.: Tm=172° C., heat of fusion 9.7 J/g (the α crystal fraction ($X_\alpha$) with respect to the amount of the PLA component is 21%)

Comparative Example 1-2

Crystallization at 120° C.: Tm=169° C., heat of fusion 7.4 J/g (the α crystal fraction ($X_\alpha$) with respect to the amount of the PLA component is 16%)

Comparative Example 1-3

Crystallization at 125° C.: Tm=169° C., heat of fusion 4.5 J/g (the α crystal fraction ($X_\alpha$) with respect to the amount of the PLA component is 9.6%)

Comparative Example 1-4

Crystallization at 130° C.: Tm=169° C., heat of fusion 4.9 J/g (the α crystal fraction ($X_\alpha$) with respect to the amount of the PLA component is 10%)

Figure 13:
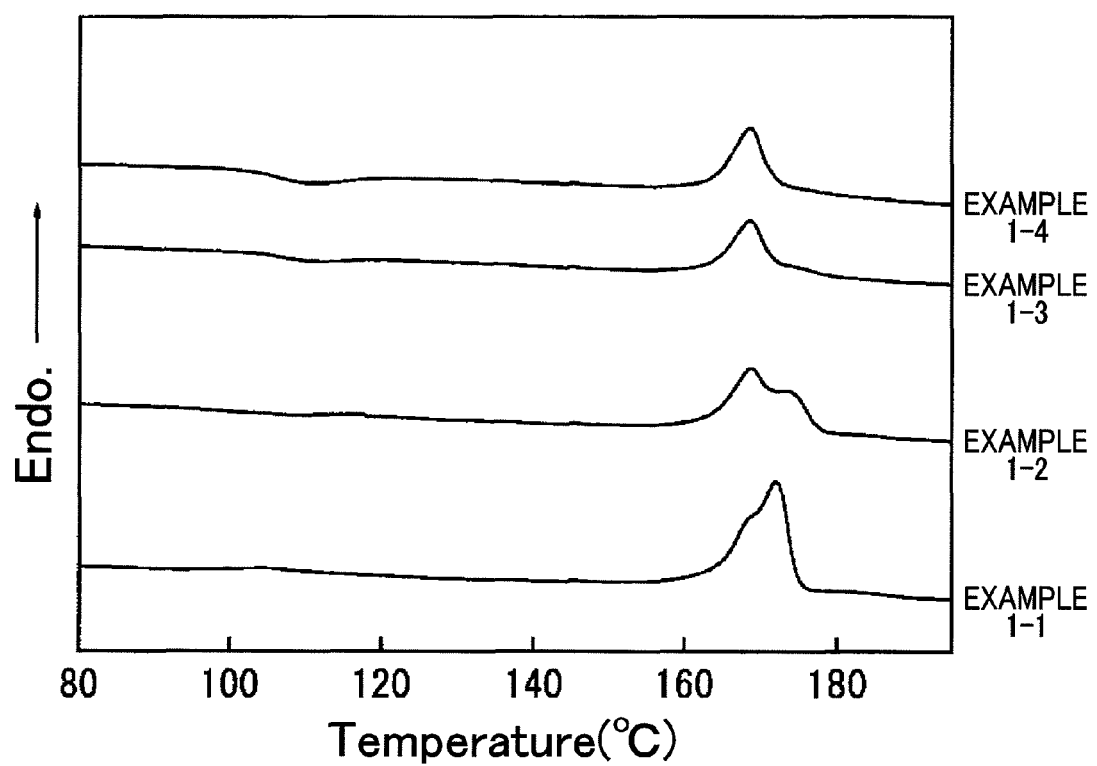
FIG. 13 is a graph showing the results of DSC measurement of the films obtained in Comparative Example 1.

The DSC chart obtained when the measurement of melting point was carried out in Comparative Example 1 is shown in FIG. 13. Further, the melting point and heat of fusion of each crystal obtained in Comparative Example 1 are shown in the following Table 8.

TABLE 8

|  | Tm (° C.) | ΔHf | Xα (%) |
|---|---|---|---|
| Comparative Example 1-1 | 172 | 9.7 | 21 |
| Comparative Example 1-2 | 169 | 7.4 | 16 |
| Comparative Example 1-3 | 169 | 4.5 | 9.6 |
| Comparative Example 1-4 | 169 | 4.9 | 10 |

As described in Table 1 to Table 7, the polylactic acids according to Example 1 to Example 11, which were obtained by the production method of the present invention, have a high melting point, and exhibit excellent heat resistance, as compared with Comparative Example 1, which was obtained by subjecting the diblock copolymer, that is a raw material, to melt heat treatment, and then crystallization. Further, by the method described in Comparative Example 1, stereo complex crystals were not obtained, and it is understood that the polylactic acid thus obtained has a low melting point.

Comparative Example 2

The poly-L-lactic acid (PLLA)/polystyrene (PS) diblock copolymer (PLLA molecular weight 19,500, PS molecular weight 21,000, molecular weight distribution 1.1) obtained in Synthesis Example 1 was dissolved in p-xylene at 130° C., such that the polymer concentration was 1% by weight. This was casted on a petri dish made of Teflon (registered trademark) at room temperature, followed by drying. Further, the resultant was dried under reduced pressure for 24 hours.

WAXD measurement was conducted in a manner substantially similar to that in Example 1, and it was revealed that the crystals thus obtained were all α crystals, and from the DSC measurement, it was revealed that Tm=165° C.

From the results, it is understood that stereo complex crystals are not obtained by only preparing a solution of the diblock copolymer, that is a raw material, and then casting the solution, and that the melting point of the obtained polylactic acid is low.

Comparative Example 3

0.5 g of a poly-L-lactic acid (PLLA) homopolymer (trade name: LACEA, manufactured by Mitsui Chemicals, Inc.; molecular weight 230,000) and 0.5 g of a poly-D-lactic acid (PDLA) homopolymer (manufactured by PURAC; molecular weight 230,000) were dissolved in chloroform at room temperature (25° C.), such that the total polymer concentration was 1% by mass, thereby obtaining a polymer mixture solution. This was casted in a manner substantially similar to that in Example 1, followed by drying. Further, the resultant was dried under reduced pressure for 24 hours.

WAXD measurement was conducted in a manner substantially similar to that in Example 1, and it was revealed that the crystals thus obtained were a mixture of α crystals and SC crystals, and α crystal: Tm=165° C., heat of fusion 18 J/g (the α crystal fraction is 19%)

SC crystal: Tm=215° C., heat of fusion 22 J/g (the SC crystal fraction is 14%).

From the results, it is understood that sufficient stereo complex crystals are not produced by the method including mixing a PLLA homopolymer and a PDLA homopolymer, each having a high molecular weight, to obtain a polymer mixture solution, and that the melting point of the stereo complex crystal thus obtained is low as compared with Example 1 to Example 11.

Comparative Example 4

Next, according to the method described in non-patent document 2 [Polymer, Vol. 49, page 5670 (2008)], 0.5 g of a poly-L-lactic acid (PLLA) homopolymer (molecular weight 36,000) and 0.5 g of a poly-D-lactic acid (PDLA) homopolymer (molecular weight 19,000) were dissolved in chloroform at room temperature (25° C.), such that the total polymer concentration was 1% by mass, thereby obtaining a polymer mixture solution. This was casted in a manner substantially similar to that in Example 1, followed by drying. Further, the resultant was dried under reduced pressure for 24 hours, to obtain a film.

WAXD measurement was conducted in a manner substantially similar to that in Example 1, and it was revealed that the crystals thus obtained were all SC crystals (FIG. 5), and from the DSC measurement, it was revealed that Tm=216° C., and the heat of fusion was 64 J/g (the SC crystal fraction was 41%).

In conclusion, stereo complex crystals were obtained at a high content ratio by using a PLLA homopolymer and a PDLA homopolymer, each having a relatively low molecular weight, and the heat of fusion was great, however the melting temperature was low, since the molecular weight was low and the mobility was not restricted, and thus, a polylactic acid having heat resistance sufficient for the formation of synthetic fibers or molded bodies was not obtained.

From the results of the above examples and comparative examples, in a case in which the molecular weights of the polylactic acids used are low, SC crystals are formed to some extent also by mixing equal amounts of PLLA homopolymer+PDLA homopolymer, but the melting point thereof is low, and is 216° C. at best.

On the contrary, in the examples according to the production method of the present invention, polylactic acids which contain stereo complex crystals with high efficiency and have higher melting points than those of the comparative examples were obtained. The polylactic acids of the present invention obtained by the production method described in Example 1 to Example 11 have a high melting temperature and exhibit excellent heat resistance, and therefore, it is understood that the polylactic acids of the present invention are useful for molded bodies or fiber products to be formed by thermal processing. Further, a porous body can be obtained by decomposing and removing the component other than polylactic acid from the molded body or fiber.

Example 12

Production of Molded Body

Figure 14:
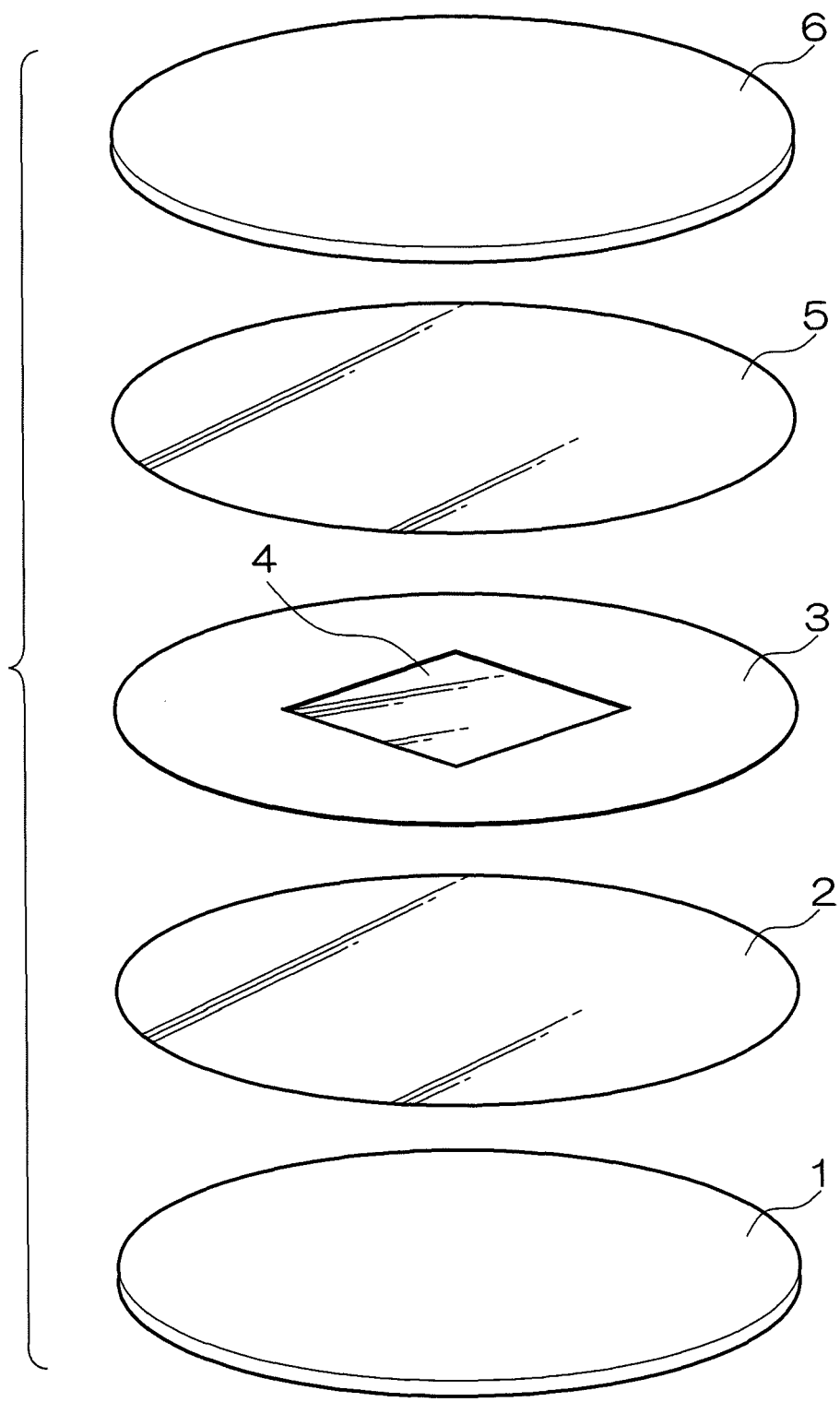
FIG. 14 is a schematic diagram illustrating a preparation procedure of the molded films used in Example 12 and Example 13.

As shown in FIG. 14, polyimide membrane 2 for separating which had a thickness of 125 μm was placed on disk-shaped stainless-steel plate 1 having a size of 110 mmφ in diameter×2 mm in thickness, then substance 3 (a stainless-steel thin plate with a rectangular window) prepared by hollowing out a disk-shaped stainless-steel plate having a size of 110 mmφ in diameter×0.3 mm in thickness to have a rectangular window having a size of 30 mm×30 mm was placed, and then 1 g of film 4 obtained in Example 1 was placed on the interior of the window. On the structure thus obtained, polyimide membrane 5 for separating which had a thickness of 125 μm was placed, and further, disk-shaped stainless-steel plate 6 having a size of 110 mmφ in diameter×2 mm in thickness was placed thereon.

The whole laminated body was placed between the upper plate and the lower plate of a press machine (manufactured by Baldwin Co., Ltd.) provided in a vacuum chamber at room temperature and, after reducing the pressure to $1.33 \times 10^{-1}$ Pa using a rotary pump, the upper plate and the lower plate were moved to make the distance closer as possible such that no stress was applied, followed by heating at 250° C., and the temperature was maintained at 250° C. for 5 minutes, and thereafter, while maintaining the state of applying pressure with a pressure of 4.5 MPa (cylinder pressure 60 Pa), the power source of the heater was turned off, and the temperature was slowly cooled to room temperature under reduced pressure. Thereafter, the vacuum chamber was opened and a molded film (a molded body formed from the polylactic acid obtained in Example 1) of Example 12 was taken out.

The tensile breaking strength of the molded film thus obtained was measured. The measurement of this mechanical property was carried out, using a universal testing machine RTC-1325A manufactured by Baldwin Co., Ltd., at room temperature. From the molded film, sample pieces in a rectangular strip shape (straight line portion 30 mm, width 5 mm) were cut out, and tensile testing was carried out at a crosshead speed of 60 mm/min. As a result, it was revealed that the tensile breaking strength of the obtained film was 30 MPa.

Further, the melting point of the molded body film was measured in a manner substantially similar to that in Example 1, and it was revealed that the melting point owing to the raw material was 241° C.

From the results of Example 12, it is understood that the molded body formed from the polylactic acid of the present invention, which is obtained by the production method of the present invention, has excellent breaking strength even though it has experienced a molding temperature of 250° C., and herewith, the polylactic acid of the present invention can be suitably used for the production of various molded bodies such as heating and pressurizing molding.

Example 13

Instead of using the stainless-steel thin plate 3 with a rectangular window in FIG. 14, substance 3 (a polyimide membrane with a rectangular window) prepared by hollowing out a polyimide membrane, which had been cut into a shape of a disk having a size of 110 mmφ in diameter×50 μm in thickness, to have a rectangular window having a size of 30 mm×30 mm was used. Namely, polyimide membrane 2 for separating which had a thickness of 125 μm was placed on disk-shaped stainless-steel plate 1 having a size of 110 mmφ in diameter×2 mm in thickness, then the polyimide membrane 3 (having a thickness of 50 μm) with a rectangular window was placed, and then a sheet of the film obtained in Example 4 was placed on the interior of the window. On the structure thus obtained, polyimide membrane 5 for separating which had a thickness of 125 μm was placed, and further, disk-shaped stainless-steel plate 6 having a size of 110 mmφ in diameter×2 mm in thickness was placed thereon.

The whole laminated body was placed between the upper plate and the lower plate of a press machine (manufactured by Baldwin Co., Ltd.) provided in a vacuum chamber at room temperature and, after reducing the pressure to $1.33 \times 10^{-1}$ Pa using a rotary pump, the upper plate and the lower plate were moved to make the distance closer as possible such that no stress was applied, followed by heating at 225° C., and the temperature was maintained at 225° C. for 30 minutes, and thereafter, while maintaining pressing with a pressure at a cylinder pressure of 10 MPa, the power source of the heater was turned off, and the temperature was slowly cooled to room temperature under reduced pressure. Thereafter, the vacuum chamber was opened and a molded film of Example 13 was taken out.

The tensile breaking strength of the molded film thus obtained was measured. The measurement of this mechanical property was carried out, using a universal testing machine RTC-1325A manufactured by Baldwin Co., Ltd., at room temperature. From the molded film, sample pieces in a rectangular strip shape (straight line portion 30 mm, width 5 mm) were cut out and tensile testing was carried out at a cross-head speed of 60 mm/min. As a result, it was revealed that the tensile breaking strength of the obtained film was 10 MPa. From this result, it is understood that the molded body formed from the polylactic acid of the present invention, which is obtained by the production method of the present invention, has excellent breaking strength, even though it was pressed at a temperature equal to or lower than the melting point.

Figure 15A:
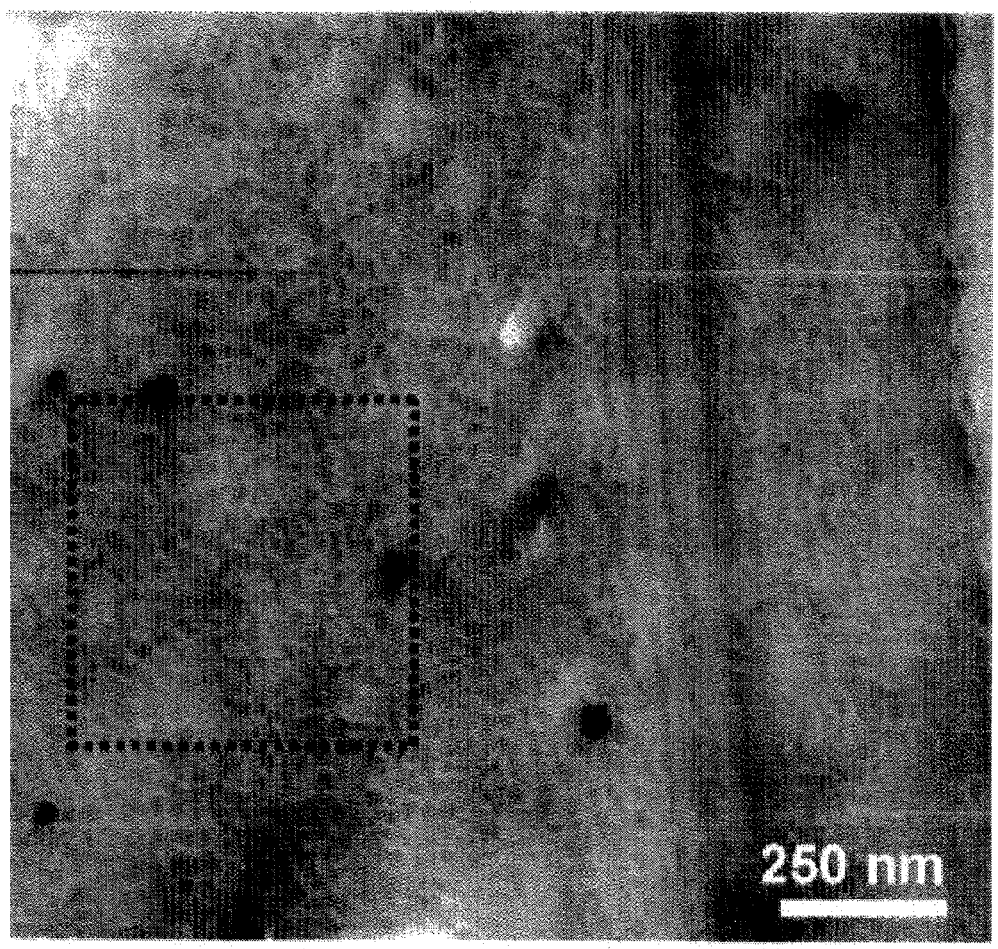
FIG. 15A is a scanning probe microscope observation image of the film obtained in Example 13.
Figure 15B:
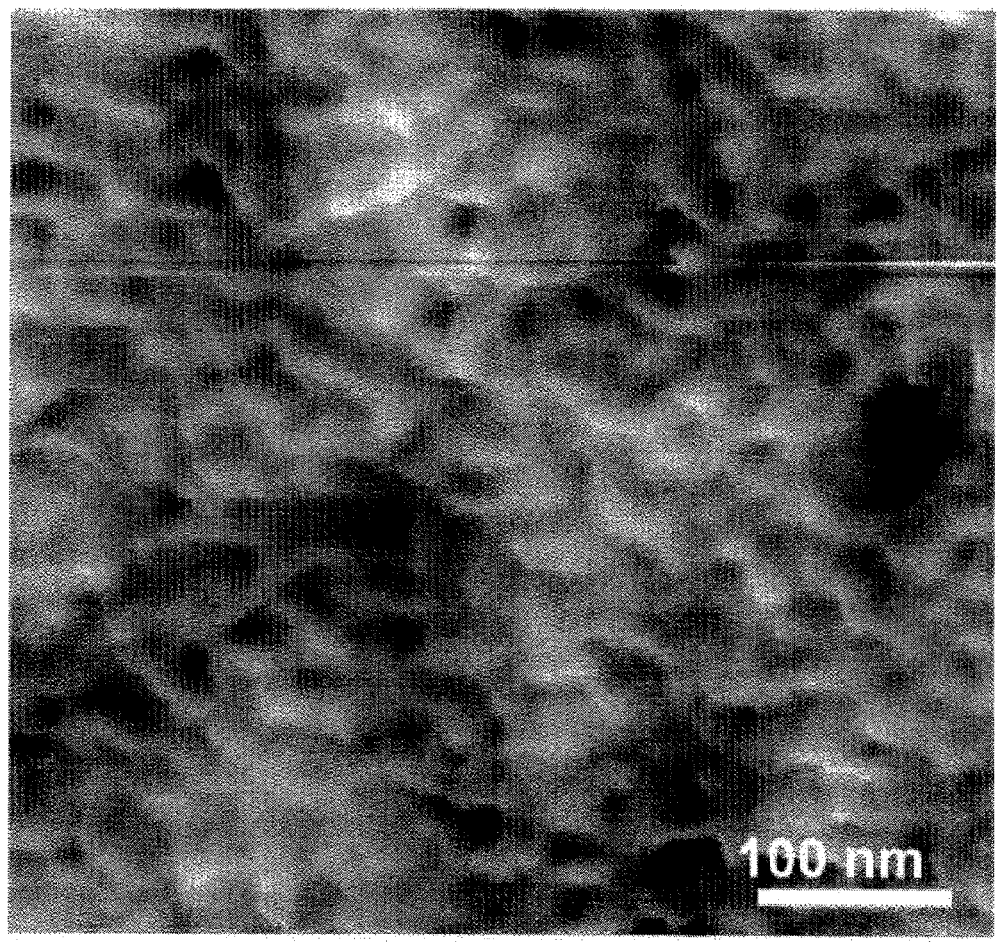
FIG. 15B is an enlarged fragmentary view of the region surrounded by dotted lines shown in FIG. 15A of a film obtained in Example 13.

The surface structure of the film obtained in Example 13 was observed by a scanning probe microscope. The observation image thus obtained is shown in FIG. 15. (B) is an enlarged view of the portion surrounded by dotted lines shown in (A). A networked linking structure owing to the micro-phase separated structure of the block copolymer can be observed, and it is thought that this structure has become a skeleton to provide a molded body having excellent strength.

Example 14

Production of Porous Body

The film obtained in Example 1 was cut into a size of 30 mm×30 mm, and placed in a 50 mL beaker, and to this, 30 mL of cyclohexane were added, and this was treated using an ultrasonic homogenizer (trade name: UH-600S, manufactured by SMT CO., LTD.) with an output power of 600 W and a frequency of 20 Hz, at room temperature for 6 hours. The resultant was taken out, and then washed three times with an excess amount of cyclohexane to remove the polystyrene component that has been decomposed by the ultrasonic treatment, thereby obtaining a porous body having a large number of fine holes owing to the polystyrene portions that had been removed.

Figure 16:
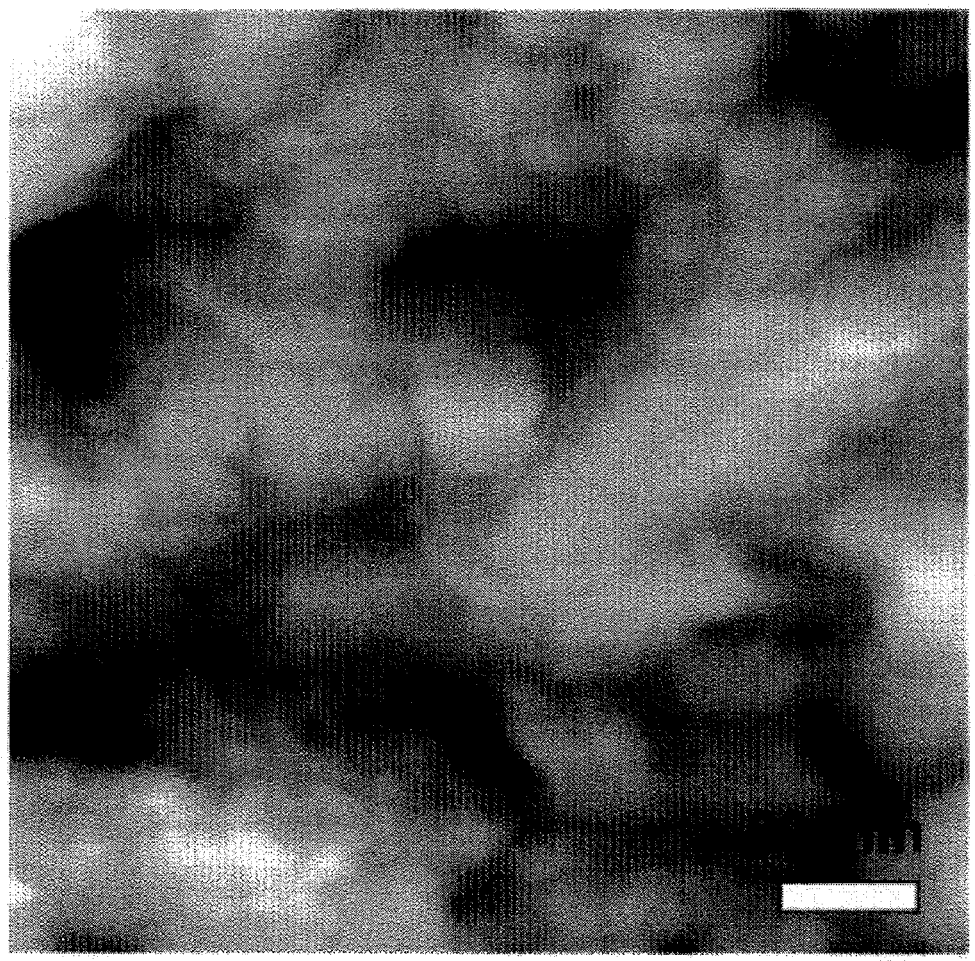
FIG. 16 is a scanning probe microscope observation image of the porous body obtained in Example 14.

The structure of this porous membrane was observed using a scanning probe microscope, E-SWEEP (trade name), manufactured by SII NanoTechnology Inc., in non-contact mode. As a result, as shown in FIG. 16, it was confirmed that this porous membrane was a porous body having a porous structure with a pore diameter of from 10 nm to 100 nm.

In the porous body of Example 14, the holes are linked to the deep internal of the membrane, and since the porous body of Example 14 has a high melting point owing to the polylactic acid of the present invention, which is the raw material, the porous body has excellent heat resistance and excellent moldability, and is suitably used for various applications such as industrial materials such as a chemical filter or a lithium ion battery separator, or medical supplies such as a blood purifying filter, a foothold material for cell proliferation, or a separation membrane for implantable glucose sensor.

<Evaluation of Porous Body>

Evaluation of the molecule permeability of the porous membrane was performed with reference to the literature [ACS Nano, 2009, Vol. 3, pages 924-932] reported by the present inventors. A membrane permeation apparatus (trade name: PERMCELL, manufactured by Vidrex Co., Ltd.) is used, and the porous membrane prepared in Example 14 is held at the aperture portion (membrane area: 5 cm$^2$) between the glass cells (volume: 50 mL) separated into two parts, which is held by a clip through an O-ring. Thereafter, one of the cells is filled with an aqueous solution of D-glucose having a concentration of 100 mM (mmol/L), and the other is filled with pure water. The solutions in the two cells are stirred (at room temperature) for a constant time with a stirring bar (diameter 3 mm, length 7 mm) made of Teflon (registered trademark), and then a portion of the solution in the cell that has been filled with water at the beginning is taken out, to measure the index of refraction. In this process, by measuring the indexes of refraction of plural solutions with known glucose concentrations, an analytical curve of "index of refraction" versus "glucose concentration" can be drawn, and according to this analytical curve, the glucose concentration is calculated from the index of refraction.

Measuring wavelength: sodium D-line of 589.3 nm

Apparatus: digital refractometer RX-5000α (trade name, manufactured by Atago Co., Ltd.)

As a result, when the porous membrane (having a thickness of about 75 μm) obtained in Example 14 was used, the glucose concentration measured after stirring for 3 hours was 5 mM. From this, it was confirmed that glucose had passed through the porous membrane and had moved to the cell at the opposite side, and thus, it was confirmed that the porous membrane obtained in Example 14 had communicating holes.

When the same evaluation was performed using the molded body film (having a thickness of about 60 μm) obtained in Example 12, which had not been subjected to etching, as a contrast example, the glucose concentration was 0.1 mM, and thus, it is understood that through holes were not formed in the molded body film obtained in Example 12. Further, when the same measurement was performed using a commercially available alumina porous membrane (trade name: ANODISC MEMBRANE FILTER 25, manufactured by Whatman; construction material: alumina, membrane thickness: 60 μm, percentage of voids: from 25% to 50%), the glucose concentration was 50 mM, and thus, it was realized that glucose had permeated thoroughly. Accordingly, it was confirmed that the porous membrane obtained in Example 14 was a porous body having fine through holes.

Example 15

Production of Ion Conductor

The film obtained in Example 1 was placed in a glass petri dish, immersed in a cyclohexane solution of chlorosulfonic acid, which had been prepared to have a concentration of 0.2 mol/L, and was treated at room temperature for one hour. The treated membrane was washed three times with cyclohexane, and this was dried under reduced pressure at room temperature for 24 hours to remove the remaining solvent, and then the resulting membrane was further washed three times with ion exchanged water, followed by drying under reduced pressure at room temperature for a period of 6 hours or more, thereby obtaining an ionic (protonic) conducting membrane.

The sulfonation degree, water content, and protonic conductance of this ionic conducting membrane were measured, according to JP-A No. 2008-248116, which is the previous patent of the present inventors.

1. Sulfonation Degree

The sulfonation degree was calculated according to the following equation.

Sulfonation degree(%)=(Number of moles of the sulfonic acid groups substituted through sulfonation treatment/Number of moles of benzene rings)×100

2. Water Content

The weight of the membrane in the state of being saturated with water, which was prepared by immersing the membrane in ion exchanged water at room temperature (25° C.) for 24 hours, and the weight of the membrane after the membrane was dried under reduced pressure at 50° C. for 8 hours and then at 100° C. for 24 hours were measured, and the water content was determined according to the following equation.

Water content(%)=$(M_W-M_D)$×100/$M_D$ $M_W$: the weight of the membrane in the state of being saturated with water $M_D$: the weight of the membrane after drying 3. Protonic Conductance The protonic conductance was measured in accordance with the alternating current impedance method. The measurement conditions are as follows.

| Bias voltage | 0 V |
| Alternating current amplitude | 300 mV |
| Measuring frequency | from 1 Hz to $2 \times 10^7$ Hz |

4. Ion Exchange Capacity ($E_W$)

From the number average molecular weight of the block copolymer (including the PLLA component) that had been subjected to sulfonation and the number of styrene units in the block copolymers used as the raw material, the ion exchange capacity was calculated as follows.

Ew=Molecular weight per one sulfonic acid group

With regard to the obtained ionic conducting membrane, the results obtained by performing these measurements are shown below.

<Measurement Results of Protonic Conducting Membrane>

| Water content | 108.0% |
| Protonic conductance (50° C., 90% RH) | 0.04 S/cm |
| Sulfonation degree | 100% |
| Ion exchange capacity (Ew) | 280 |

Contrast Example

As a contrast example, the same measurements were performed using NAFION NRE 211CS (trade name, manufactured by DuPont), which is a commercially available perfluorocarbon sulfonic acid membrane. The results are shown below.

| Water content | 30% |
| Protonic conductance (50° C., 90% RH) | 0.1 S/cm |
| Ion exchange capacity (Ew) | 1000 |

As shown above, it is understood that, also in the comparison with the commercially available protonic conducting membrane, that is the contrast example, although the numeric values are slightly smaller, the ionic conducing membrane of the present invention has achieved practically non-problematic protonic conductance and ion exchange capacity, and thus, the ionic conducting membrane of the present invention is noticed as an electric conducting membrane which is synthesized from lactic acid that is a plant-based raw material, has biocompatibility, and does not use a petroleum-based raw material.

Example 16

The film obtained in Example 11-7 was placed in a glass petri dish, immersed in a cyclohexane solution of chlorosulfonic acid which had been prepared to have a concentration of 0.2 mol/L, and was treated at room temperature for three hours. The treated membrane was washed three times with cyclohexane, and this was dried under reduced pressure at room temperature for 24 hours to remove the remaining solvent, and then the resulting membrane was further washed three times with ion exchanged water, followed by drying under reduced pressure at room temperature for a period of 6 hours or more, thereby obtaining an ionic (protonic) conducting membrane.

Measurements of sulfonation degree, water content, and protonic conductance of this ionic conducting membrane were performed in a manner substantially similar to that in Example 15. As a result, the following values were obtained.

| Water content | 52.4% |
| Protonic conductance (50° C., 90% RH) | 0.04 S/cm |
| Sulfonation degree | 100% |
| Ion exchange capacity (Ew) | 280 |

From these results, it is understood that, as the SC crystal fraction gets higher, the skeleton is easily maintained and the water content is suppressed low.

What is claimed is:

1. A method for producing stereo complex crystals of polylactic acid, the method comprising:
    dissolving, in a solvent, to prepare a polymer mixture solution optionally comprising a filler:
        a block copolymer comprising at least one kind of organic polymer having a different structure from polylactic acid and polylactic acid containing an L-lactic acid unit or polylactic acid containing a D-lactic acid unit; and
        a polylactic acid homopolymer containing a D-lactic acid unit that is an optical isomer that is not contained in the block copolymer or a polylactic acid homopolymer containing an L-lactic acid unit that is an optical isomer that is not contained in the block copolymer; and
    removing at least a portion of the solvent from the polymer mixture solution to obtain a polymer mixture optionally comprising a filler.

2. The method for producing stereo complex crystals of polylactic acid according to claim 1, the method further comprising performing a heat treatment after removing the solvent from the polymer mixture solution.

3. The method for producing stereo complex crystals of poly lactic acid according to claim 1, wherein, in the polymer mixture solution, a content ratio of the polylactic acid containing an L-lactic acid unit or the polylactic acid containing a D-lactic acid unit, which is contained in the block copolymer, relative to the content of the polylactic acid homopolymer containing a D-lactic acid unit or the polylactic acid homopolymer containing an L-lactic acid unit is in a range of from 10:90 to 90:10.

4. The method for producing stereo complex crystals of polylactic acid according to claim 1, wherein, in the polymer mixture solution, the molecular weight of the polylactic acid containing an L-lactic acid unit or the polylactic acid containing a D-lactic acid unit, which is contained in the block copolymer, is from 10,000 to 1,000,000.

5. The method for producing stereo complex crystals of polylactic acid according to claim 1, wherein, in the polymer mixture solution, the molecular weight of the polylactic acid homopolymer containing a D-lactic acid unit or the polylactic acid homopolymer containing an L-lactic acid unit is from 10,000 to 1,000,000.

6. The method for producing stereo complex crystals of polylactic acid according to claim 2, wherein the heat treatment of the obtained polymer mixture is performed at a heat treatment temperature in a range of from 100° C. to 250° C. for a heat treatment time in a range of from 1 minute to 72 hours.

7. The method for producing stereo complex crystals of polylactic acid according to claim 1, wherein the organic polymer having a different structure from polylactic acid comprises one or more kinds selected from the group consisting of polystyrene, polyvinyl naphthalene, polymethyl methacrylate, poly-8-caprolactone, polybutadiene, polydimethylsiloxane, polyethylene, polypropylene, poly-I-butene, poly-4-methyl-I-pentene, polynorbornenyl ethyl styrene, polynorbornenyl ethylstyrene-s-styrene, polyhexamethyl carbonate, polyhexylnorbornene, polybutyl succinate, polydicyclopentadiene, polycyclohexyl ethylene, poly-1,5-dioxepan-2-one, polymenthide, poly-4-vinylpyridine, polyisoprene, poly-3-hydroxybutyrate, poly-2-hydroxyethyl methacrylate, poly-N-vinyl-2-pyrrolidone, poly-4-acryloylmorpholine, and derivatives thereof.

8. The method for producing stereo complex crystals of polylactic acid according to claim 1, wherein the organic polymer having a different structure from polylactic acid comprises one or more kinds selected from the group consisting of polystyrenesulfonic acid, polyethylene glycol, polyethylene oxide, poly-n-propyl-p-styrenesulfonic acid, polyacrylamide, polydimethylacrylamide, poly-N-isopropylacrylamide, poly-2-(N,N-dimethylamino)ethyl methacrylate, poly-N-2-hydroxypropyl-methacrylamide, and derivatives thereof.

9. The method for producing stereo complex crystals of polylactic acid according to claim 1, wherein, in the block copolymer comprising at least one kind of organic polymer having a different structure from polylactic acid and polylactic acid containing an L-lactic acid unit or polylactic acid containing a D-lactic acid unit, the content ratio of the polylactic acid containing an L-lactic acid unit or the polylactic acid containing a D-lactic acid unit relative to the organic polymer having a different structure from polylactic acid is in a range of from 10:90 to 90:10.

10. A polylactic acid-containing polymer mixture obtained by the method for producing stereo complex crystals of polylactic acid according to claim 1, having a content ratio of stereo complex crystals of 10% by mass or higher, with respect to the total amount of the polylactic acid components, a content ratio of the organic polymer having a different structure from polylactic acid of from 1% by mass to 99% by mass, and a melting point of from 220° C. to 260° C.

11. A molded body comprising the polylactic acid-containing polymer mixture according to claim 10.

12. A synthetic fiber comprising the polylactic acid-containing polymer mixture according to claim 10.

13. A porous body formed by decomposing and removing at least a portion of the organic polymer and/or at least a portion of the filler from the polylactic acid-containing polymer mixture according to claim 10.

14. An ion conductor formed by applying an ion source to the organic polymer in the polylactic acid-containing polymer mixture according to claim 10.

15. A porous body formed by decomposing and removing at least a portion of the organic polymer and/or at least a portion of the filler from the molded body according to claim 11.

16. A porous body formed by decomposing and removing at least a portion of the organic polymer and/or at least a portion of the filler from the synthetic fiber according to claim 12.

17. An ion conductor formed by applying an ion source to the organic polymer in the molded body according to claim 11.

18. An ion conductor formed by applying an ion source to the organic polymer in the synthetic fiber according to claim 12.

* * * * *